United States Patent
Ishida

(10) Patent No.: US 7,889,938 B2
(45) Date of Patent: Feb. 15, 2011

(54) METHOD AND APPARATUS FOR PROCESSING LINE DRAWINGS IN IMAGES

(75) Inventor: Yoshihiro Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 11/689,326

(22) Filed: Mar. 21, 2007

(65) Prior Publication Data

US 2007/0230809 A1    Oct. 4, 2007

(30) Foreign Application Priority Data

Mar. 31, 2006   (JP) .............................. 2006-100377
Mar. 31, 2006   (JP) .............................. 2006-100380
Mar. 31, 2006   (JP) .............................. 2006-100381

(51) Int. Cl.
     *G06K 9/36*        (2006.01)
(52) U.S. Cl. ..................................... 382/242
(58) Field of Classification Search .................. 382/242
     See application file for complete search history.

(56) References Cited

U.S. PATENT DOCUMENTS

| | | | | |
|---|---|---|---|---|
| 4,020,463 A | * | 4/1977 | Himmel | 382/242 |
| 4,093,941 A | * | 6/1978 | Bryan et al. | 382/197 |
| 4,777,651 A | * | 10/1988 | McCann et al. | 382/242 |
| 5,357,602 A | * | 10/1994 | Ohta | 345/442 |
| 5,878,161 A | | 3/1999 | Ishida et al. | |
| 5,978,520 A | * | 11/1999 | Maruyama et al. | 382/294 |
| 5,987,173 A | * | 11/1999 | Kohno et al. | 382/199 |
| 6,111,994 A | * | 8/2000 | Katayama et al. | 382/298 |
| 6,404,921 B1 | | 6/2002 | Ishida | |
| 6,480,302 B1 | * | 11/2002 | Kawano | 358/2.1 |
| 2006/0192781 A1 | * | 8/2006 | Iwata et al. | 345/467 |

FOREIGN PATENT DOCUMENTS

| | | | |
|---|---|---|---|
| EP | 1538547 A1 | * | 6/2005 |
| JP | 02014372 A | * | 1/1990 |
| JP | 04-157578 A | | 5/1992 |
| JP | 05-108823 A | | 4/1993 |
| JP | 05-174140 A | | 7/1993 |
| JP | 2005-346137 A | | 12/2005 |

* cited by examiner

*Primary Examiner*—Wenpeng Chen
(74) *Attorney, Agent, or Firm*—Canon U.S.A., Inc. I.P. Division

(57) ABSTRACT

In an image processing method, contour information is extracted on the basis of terminal points and intersections included in a thinned line drawing, the contour information being extracted for each of closed curves and line elements connecting the terminal points and the intersections included in the line drawing, and skeletonized vector data is generated on the basis of the contour information. Start and end terminal points in the skeletonized vector data are determined. Artificial vectors to be inserted between the determined start and end terminal points are generated, and artificial-vector-inserted vector data including the generated artificial vectors is generated. A smoothing process is performed for the artificial-vector-inserted vector data, and then smoothed, non-circumference vector data is generated on the basis of the start and end terminal points. The thinned line drawing is raster-scanned in units of a pixel matrix.

21 Claims, 32 Drawing Sheets

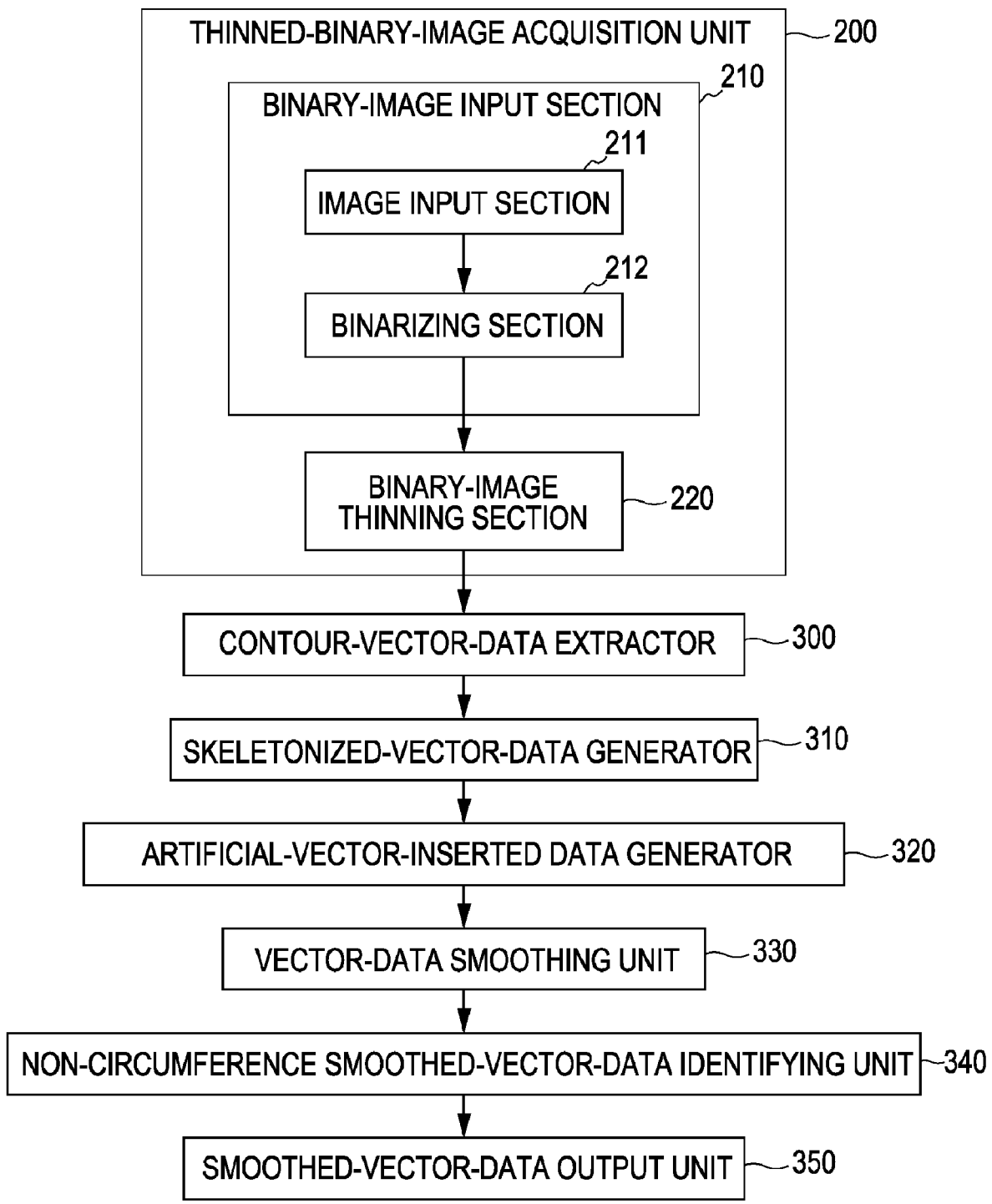

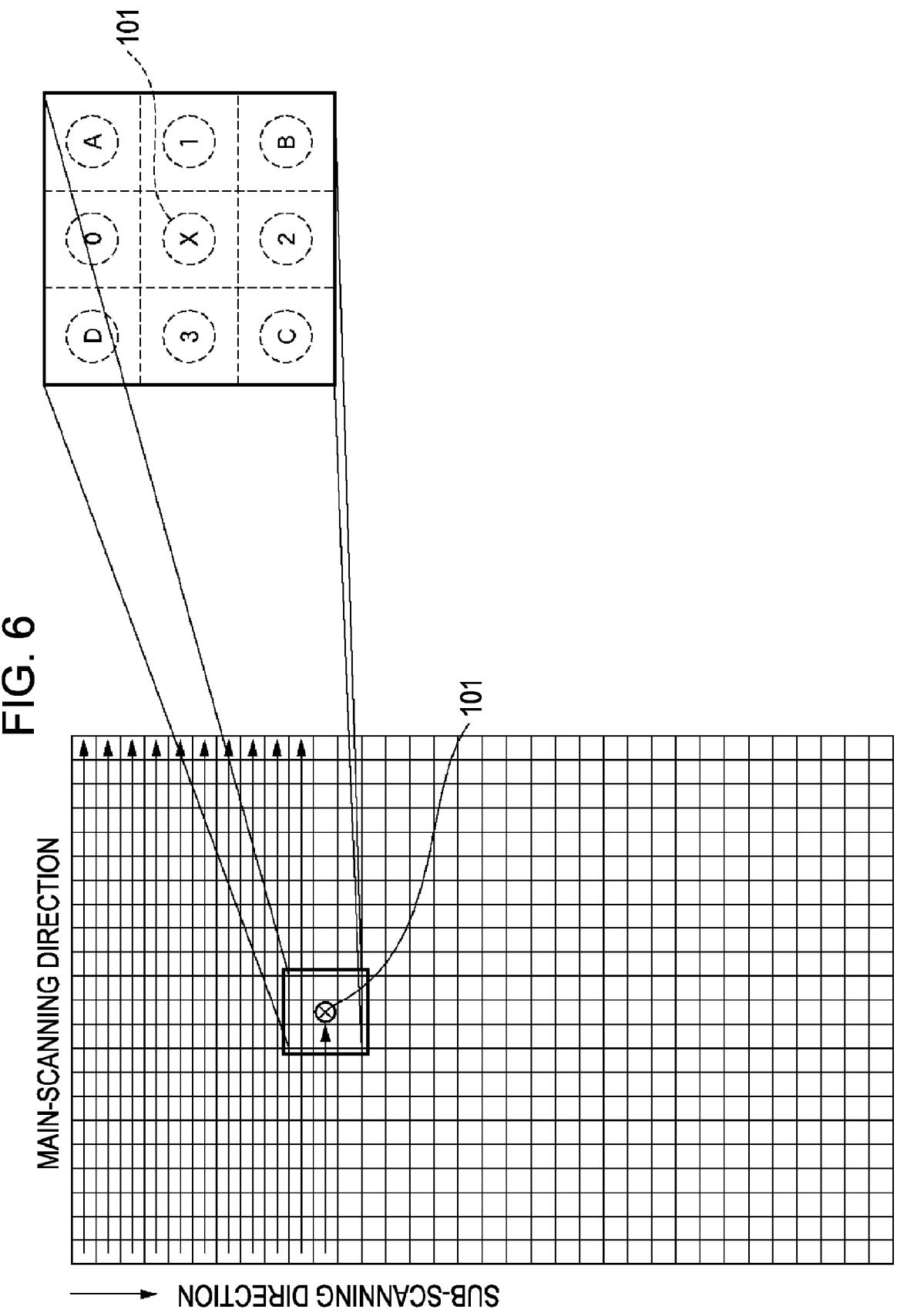

UP_RIGHT_TL    RIGHT_DOWN_TR

UP_RIGHT_LT

LEFT_UP_LB

RIGHT_DOWN_RT

DOWN_LEFT_RB

LEFT_UP_BL    RIGHT_LEFT_BR

UP_RIGHT

LEFT_DOWN

RIGHT_DOWN

UP_LEFT

DOWN_RIGHT

LEFT_UP

RIGHT_UP

DOWN_LEFT

FIG. 9

| NO. | CONTOUR-POINT INFORMATION | TERMINAL POINT INFORMATION | VALUE | HORIZONTAL (0) VERTICAL (1) | UP (0) DOWN (1) | RIGHT (0) LEFT (1) | NON-SELECTED (0) SELECTED (1) | TERMINAL POINT (1) NOT-TERMINAL POINT (0) |
|---|---|---|---|---|---|---|---|---|
| 01. | UP_RIGHT_TL | (TOP LEFT) | 01H | 0 | 0 | 0 | 0 | 1 |
| 02. | UP_RIGHT | | 02H | 0 | 0 | 0 | 1 | 0 |
| 03. | UP_RIGHT_LT | (LEFT TOP) | 03H | 0 | 0 | 0 | 1 | 1 |
| 04. | UP_LEFT | | 06H | 0 | 0 | 1 | 1 | 0 |
| 05. | DOWN_RIGHT | | 0aH | 0 | 1 | 0 | 1 | 0 |
| 06. | DOWN_LEFT_BR | (BOTTOM RIGHT) | 0dH | 0 | 1 | 1 | 0 | 1 |
| 07. | DOWN_LEFT | | 0eH | 0 | 1 | 1 | 1 | 0 |
| 08. | DOWN_LEFT_RB | (RIGHT BOTTOM) | 0fH | 0 | 1 | 1 | 1 | 1 |
| 09. | RIGHT_UP | | 12H | 1 | 0 | 0 | 1 | 0 |
| 10. | LEFT_UP_LB | (LEFT BOTTOM) | 15H | 1 | 0 | 1 | 0 | 1 |
| 11. | LEFT_UP | | 16H | 1 | 0 | 1 | 1 | 0 |
| 12. | LEFT_UP_BL | (BOTTOM LEFT) | 17H | 1 | 0 | 1 | 1 | 1 |
| 13. | RIGHT_DOWN_RT | (RIGHT TOP) | 19H | 1 | 1 | 0 | 0 | 1 |
| 14. | RIGHT_DOWN | | 1aH | 1 | 1 | 0 | 1 | 0 |
| 15. | RIGHT_DOWN_TR | (TOP RIGHT) | 1bH | 1 | 1 | 0 | 1 | 1 |
| 16. | RIGHT_DOWN | | 1eH | 1 | 1 | 1 | 1 | 0 |

CASE 0

CASE 1

CASE 2

CASE 3

CASE 4

CASE 5

CASE 6

CASE 7

CASE 8

CASE 9

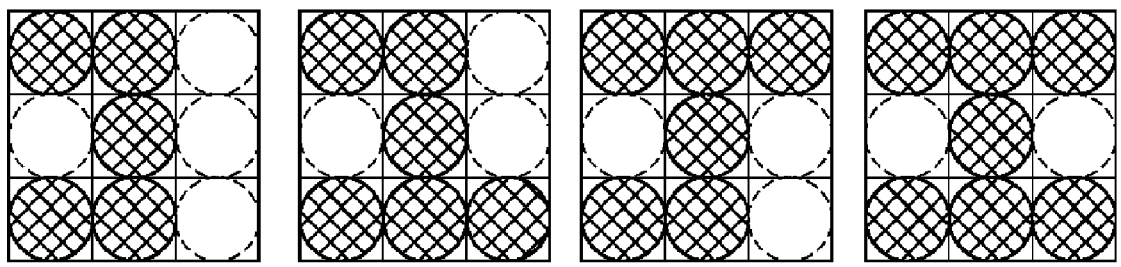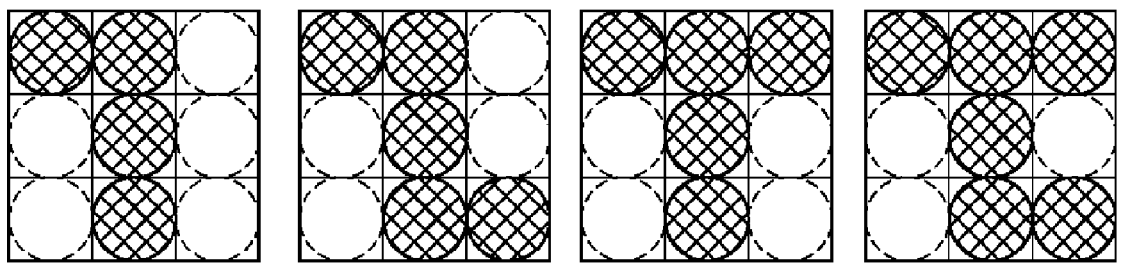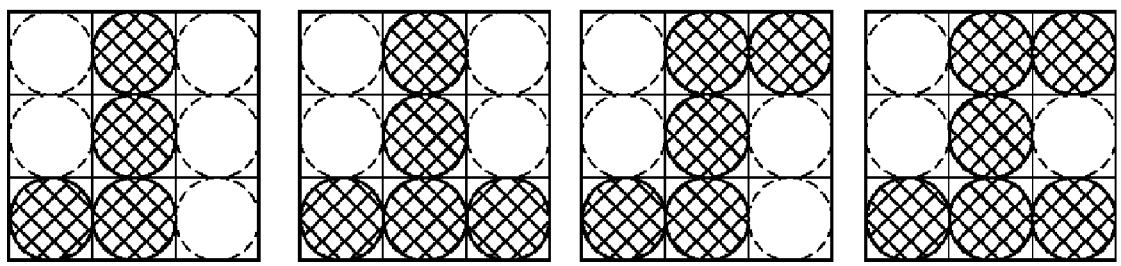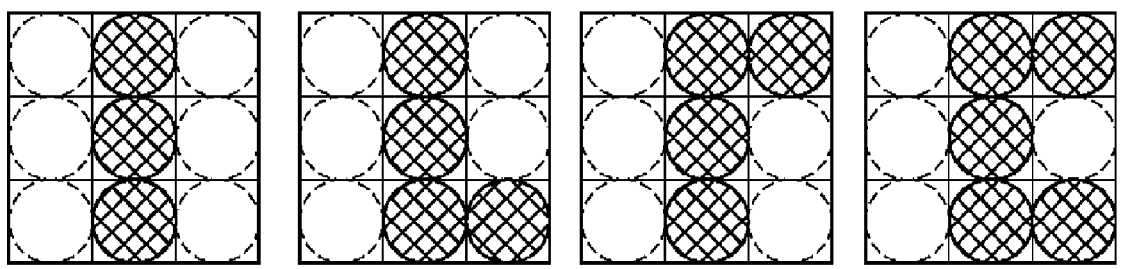
FIG. 20
CASE 10

FIG. 21 CASE 11

CASE 12

CASE 13

CASE 14

CASE 15

METHOD AND APPARATUS FOR PROCESSING LINE DRAWINGS IN IMAGES

BACKGROUND OF THE INVENTION

1. Field of the Invention

The present invention relates to an image processing technique for processing line drawings in diagrams and document images.

2. Description of the Related Art

Recently, image data are often digitized and reused to satisfy demands for reduction in the amount of paper being used. In a typical method for reusing image data, the image data are binarized and then converted into vector data using a vectorization technique. Then, the obtained vector data may be used by CAD software or the like.

A method for vectorizing a binary image is discussed in, for example, U.S. Pat. No. 6,404,921 (Japanese Patent No. 3026592), which is assigned to the assignee of this application. According to the method discussed in U.S. Pat. No. 6,404,921, states of a target pixel and pixels adjacent thereto in image data are stored, and the target pixel is extracted in the sequence of raster scanning while horizontal and vertical pixel-arranging vectors are detected on the basis of the states of the target pixel and the pixels adjacent thereto. A state of connection between the pixel-arranging vectors is determined, and a contour of the image data is extracted according to the determined state of connection between the pixel-arranging vectors.

According to the method discussed in U.S. Pat. No. 6,404,921, all of the contour lines included in an image can be extracted by a single raster scanning process. In addition, it is not necessary to use an image memory that can store all of the image data. Therefore, the capacity of the memory can be reduced.

In addition, according to Japanese Patent Laid-Open No. 5-108823 filed by the assignee of this application, contour points can be efficiently extracted by modularizing the rules of vector extraction discussed in U.S. Pat. No. 6,404,921.

On the other hand, U.S. Pat. No. 5,878,161 (Japanese Patent No. 3049672) assigned to the assignee of this application describes an image processing apparatus for providing a high-quality image whose magnification is varied using contour information of a binary image. According to U.S. Pat. No. 5,878,161, outline vectors are extracted from a binary image and are subjected to a magnification-varying process so that the magnification of the outline vectors is smoothly changed to a desired (arbitrary) magnification. Then, the thus-processed outline vectors are used to regenerate a binary image, so that a high-quality, digital binary image whose magnification is arbitrarily varied can be obtained. To extract the outline vectors from the binary image, methods discussed in, for example, U.S. Pat. No. 6,404,921 and Japanese Patent Laid-Open No. 5-108823 can be used.

In addition, Japanese Patent Laid-Open No. 2005-346137 filed by the assignee of this application discusses a method for performing function approximation of contour information of a binary data to express a high-quality image whose magnification is varied with a smaller amount of data. In this method, the contour information is approximated not only with straight lines but also with second or third order Bezier curves.

FIGS. 2A to 2D show the states of data in a process of obtaining a high-quality digital binary image whose magnification is changed to a desired magnification. In this process, first, outline vectors are extracted from a binary image and are smoothly approximated with functions. Then, the outline vectors which are approximated with functions are used to change the magnification of the binary image. FIG. 2A shows an example of a line-art image that is input. FIG. 2B shows a contour image obtained by visualizing contour vector data that is extracted from the binary image shown in FIG. 2A using the method described in U.S. Pat. No. 6,404,921 or Japanese Patent Laid-Open No. 5-108823. FIG. 2C shows an image obtained by visualizing the outline vectors obtained as a result of function approximation of the extracted contour vector data using the method described in U.S. Pat. No. 5,878, 161. FIG. 2D shows an example of a high-quality digital binary image whose magnification is changed to a desired magnification, the image being obtained by filling an area surrounded by the vectors after the smoothing (function approximation) process.

To satisfy the above-described demands for reduction in the amount of paper being used, digitization and reuse of image data included in business documents are also demanded. The image data can be reused by, for example, changing the magnification of each portion of the original image to a desired magnification without changing the relative differences in the thickness, areas, etc. In other words, a relatively thick portion in the original image remains relatively thick and a relatively thin portion in the original image remains relatively thin after the magnification-varying process. In this case, the combination of U.S. Pat. No. 5,878,161 and one of U.S. Pat. No. 6,404,921 and Japanese Patent Laid-Open No. 5-108823, or the combination of Japanese Patent Laid-Open No. 2005-346137 and one of U.S. Pat. No. 6,404,921 and Japanese Patent Laid-Open No. 5-108823 can be used to extract the contour (outline) vectors of a binary image included in the original document. Then, the magnification of the two-dimensional image is changed to an arbitrary magnification.

However, when the image data is reused in a business document or in a CAD/CAM system, there may be a case in which it is more advantageous to express each line included in a drawing as a simple line (a straight line, an open curve, a closed curve, etc.) having no width information (information regarding the thickness and area of the line) instead of expressing it with two contour lines, i.e., an outer contour line and an inner contour line.

In addition, there is also an increasing demand to reuse line images drawn only with thin lines without attaching any importance to the thickness thereof. When such a line image is reused, an editing process of, for example, partially changing the curvature or length of the lines, deleting some of the lines, adding other lines, etc., is often performed before reusing the image.

According to the methods described in U.S. Pat. No. 6,404, 921 and Japanese Patent Laid-Open No. 5-108823, all of contour lines included in a binary image can be extracted from the binary image that is stored in the sequence of raster scanning. However, line images drawn only with thin lines without attaching any importance to the thickness thereof and lines included in a certain drawing cannot be extracted as a group of closed curves and individual lines connecting terminal points and intersections. In FIG. 2C, which shows the outline vectors obtained by the above-described known method, each of the lines included in the drawing is expressed with an outer contour line and an inner contour line. In the case of extracting, for example, a group of closed graphic elements defined by lines connecting the terminal points or intersections from the outline vectors shown in FIG. 2C, if the extraction is performed using only the outer contour lines, lines cannot be divided from each other at the intersections and only one element is obtained. In addition, if the extraction is performed using only the inner contour lines, there is a possibility that segments connecting the graphic elements and contour vectors corresponding to portions protruding from the closed graphic elements will be eliminated, as shown in FIG. 2E.

SUMMARY OF THE INVENTION

In light of the above-described problems, an embodiment of the present invention provides an image-processing technique for extracting contour information from a line drawing including a thinned binary image and skeletonizing the line drawing on the basis of the extracted contour information. More specifically, an embodiment of the present invention provides an image-processing technique for expressing a line as a single line that passes through the center instead of expressing it with two lines, i.e., an outer contour line and an inner contour line.

According to an embodiment, in an image processing operation, the terminal points and intersections included in the drawing are detected, and the line information (vector data) is generated for each of the closed curves and line elements separated from each other by the terminal points and intersections.

In addition, according to an embodiment, in the image processing operation, the number of times the image is scanned is reduced. If, for example, the line elements separated from each other are directly subjected to a smoothing process, there is a possibility that the terminal points of the line elements (i.e., the terminal points or intersections of the drawing) will be displaced. An embodiment of the present invention provides a technique for preventing such a problem.

For example, according to an embodiment of the present invention, an image processing method includes extracting contour information on the basis of terminal points and intersections included in a thinned line drawing. The contour information is extracted for each of closed curves and line elements connecting the terminal points and the intersections included in the line drawing. The method further includes generating skeletonized vector data based on the extracted contour information.

In extracting contour information, an image including the thinned line drawing can be raster-scanned in units of a pixel matrix including a target pixel and pixels surrounding the target pixel, and the contour information can be extracted on the basis of a pixel value of the target pixel and pixel values of the pixels surrounding the pixel matrix.

In addition, in an embodiment, the image processing method can also include determining a start terminal point and an end terminal point in the skeletonized vector data on the basis of the information regarding the terminal points and the intersections in the line drawing, generating artificial vectors to be inserted between the determined start and end terminal points, and generating artificial-vector-inserted vector data including the generated artificial vectors. The image processing method can further include performing a smoothing process for the artificial-vector-inserted vector data; and generating smoothed, non-circumference vector data on the basis of smoothed vector data obtained in the smoothing process and the start and end terminal points.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a functional block diagram illustrating an image processing apparatus according to an embodiment of the present invention.

FIG. 6 is a diagram illustrating a target pixel and pixels adjacent to the target pixel according to an embodiment.

FIG. 9 illustrates a table of the contour-point information according to an embodiment.

FIG. 20 is a diagram illustrating examples of extraction pattern (case 10) of contour points and contour-point information in accordance with the states of the target pixel and the pixels adjacent to the pixel in the contour-vector-data extraction process.

DESCRIPTION OF THE EMBODIMENTS

First Embodiment

Figure 2A:
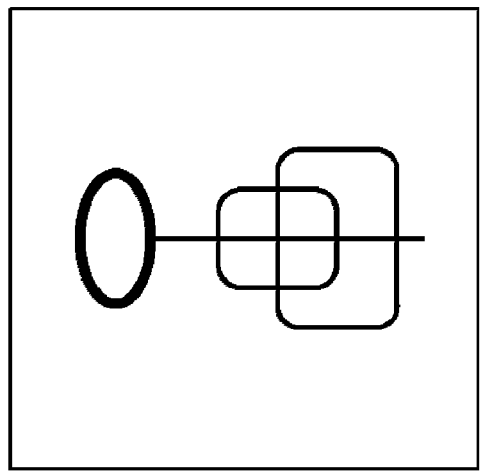
FIGS. 2A to 2E illustrate the manner in which a binary image is processed using outline vectors.
Figure 2B:
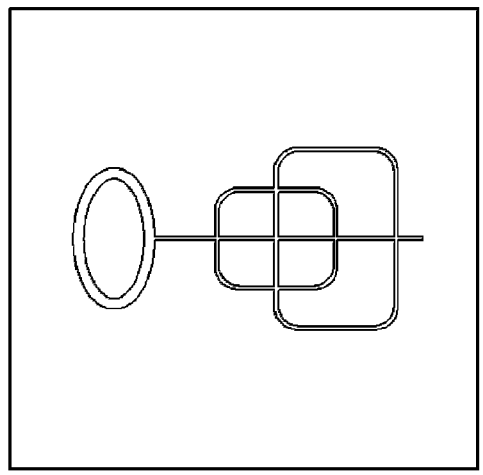
Figure 2C:
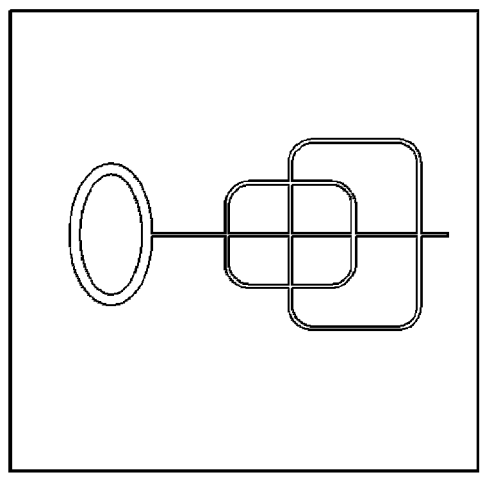
Figure 2D:
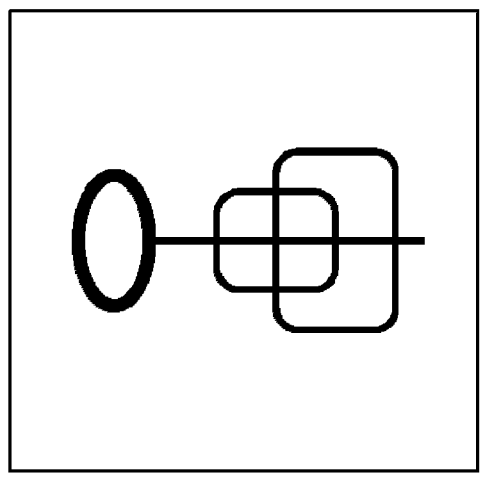
Figure 2E:
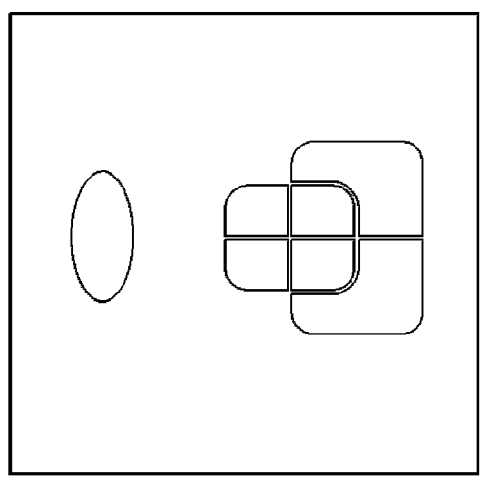

FIG. 1 is a functional block diagram illustrating an image processing apparatus according to an embodiment of the present invention. In FIG. 1, a thinned-binary-image acquisition unit 200 performs a thinning process of a binary image obtained by a binary-image input section 210 in a binary-image thinning section 220. The binary-image input section 210 includes an image input section 211, such as a scanner, and a binarizing section 212 that binarizes a scan image. The binary-image thinning section 220 performs the thinning process of the binary image on the basis of pixels connected in either of up, down, right, and left directions (4-connection). Thus, the image data obtained as a result of photoelectric scanning performed by the image input section 211, such as a scanner, is binarized by a threshold process performed by the binarizing section 212 that has a known structure. The binary-image thinning section 220 performs a thinning process of the binary image using a known thinning method, such as the Hilditch's method (see, for example, pages 51 to 54, "Dejitaru gazo syori no kiso to oyo" (Basics and applications of digital image processing), second edition, written by Koichi Sakai, published by CQ Publishing on Feb. 1, 2004, ISBN4-7898-3707-6).

Figure 3A:
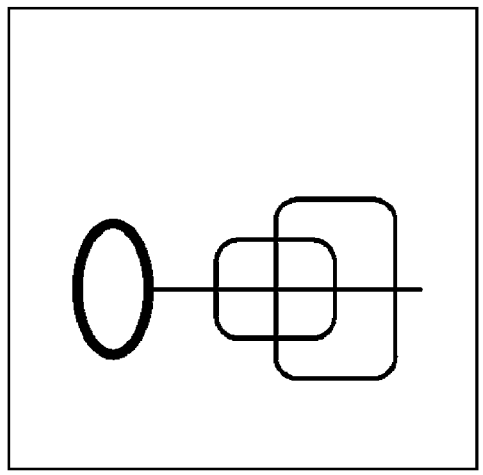
FIGS. 3A to 3F are diagrams illustrating a vector process of a line art image according to an embodiment of the present invention.
Figure 3B:
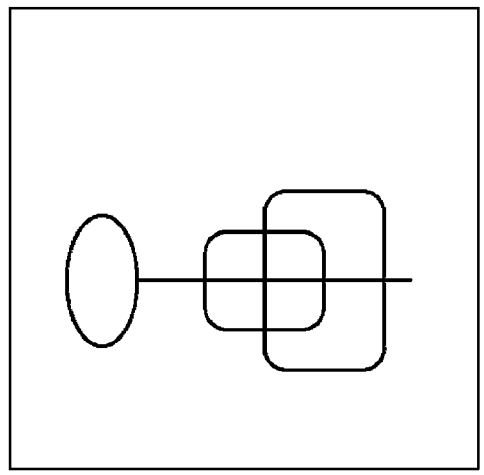

FIG. 3A shows an example of a binary image input to the binary-image thinning section 220. FIG. 3B shows a thinned image output from the binary-image thinning section 220 when the binary image shown in FIG. 3A is input thereto.

Then, the thinned binary image is processed by a contour-vector-data extractor 300. More specifically, in a single raster scanning process of the thinned binary image, a group of vector sequences is extracted from a line drawing included in the thinned binary image, the vector sequences corresponding to closed curves and independent lines connecting terminal points and intersections in the line drawing. The group of vector sequences is hereinafter called "line-element coarse contour vector data". Thus, a one-pixel-wide line drawing included in the thinned binary image is divided into line elements (straight lines or open curves) and closed curves on the basis of the terminal points and intersections in the line drawing. Then, each of the line elements and closed curves is subjected to a process of extracting a contour vector sequence that surrounds the line element or the closed curve.

The output process result includes information indicating whether or not each of the vectors included in each vector sequence is extracted from a portion corresponding to one of the terminal points (or the intersections) in the processed line drawing. This information is hereinafter sometimes called "additional information".

The group of vector sequences which each correspond to one of the closed curves and the line elements connecting the terminal points and intersections (line-element coarse contour vector data) is subjected to a process described below to generate vector data without width information (or vector data of zero-width lines) for the lines included in the drawing. The thus-obtained vector data without width information is suitable for use when each line in the diagram is to be reused as a single line or when the line width is to be changed in other applications. The combination of the above-mentioned additional information and the line-element coarse contour vector data functions as the contour vector data.

A skeletonized-vector-data generator 310 receives the contour vector data (the line-element coarse contour vector data and the additional information) and generates terminal-point-connecting skeletonized (circumference) vector data (hereinafter simply called "skeletonized vector data") which represents vectors surrounding zero-width line elements. More specifically, first, the positions of the terminal points of each line element are determined using the additional information. Then, the position of each of the vectors included in each contour vector sequence that surrounds the corresponding one-pixel-width line element is shifted by a half pixel in a direction determined on the basis of predetermined rules.

Figure 3C:
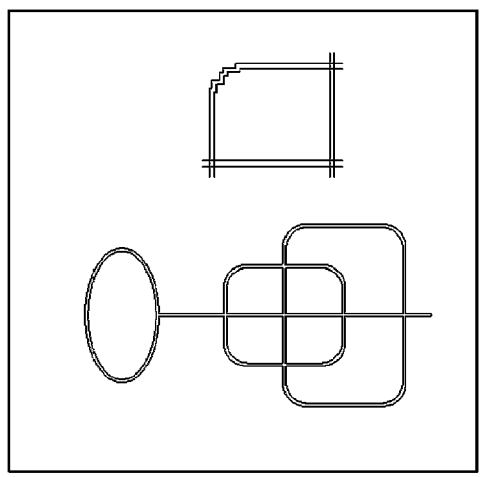
Figure 3D:
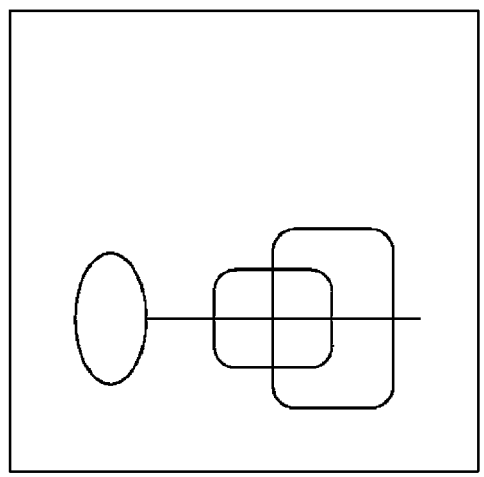

FIG. 3C illustrates a contour image obtained by visualizing the contour vector data output from the contour-vector-data extractor 300 when the binary image shown in FIG. 3B is input. In FIG. 3C, an enlarged view of a portion of the contour image is shown at the top. In this portion, the terminal points of the intersecting line elements coincide with each other at the intersections thereof. FIG. 3D shows a line image obtained by visualizing the skeletonized vector data generated by the skeletonized-vector-data generator 310 when the contour vector data (FIG. 3C) is input.

An artificial-vector-inserted data generator 320 receives the skeletonized vector data from the skeletonized-vector-data generator 310 and generates terminal-point-connecting, artificial-vector-inserted (circumference) vector data (hereinafter simply called "artificial-vector-inserted data"). More specifically, the artificial-vector-inserted data generator 320 inserts artificial vectors into the skeletonized vector data so that portions corresponding to the terminal points can be maintained as the terminal points (be used as anchor points of Bezier curves). This process is performed in order to prevent the positions of the terminal points from becoming unclear due to integration of vectors corresponding to the terminal points with other vectors when a vector-data smoothing unit 330 performs a smoothing (function approximation) process of the artificial-vector-inserted data. This process will be described in detail below. The artificial-vector-inserted data generator 320 also generates start/end terminal-point information indicating the vectors corresponding to the terminal points for each of the vector sequences included in the artificial-vector-inserted data. Here, which of the two terminal points is to be defined as the start terminal point (or the end terminal point) is determined on the basis of predetermined rules.

Figure 3E:
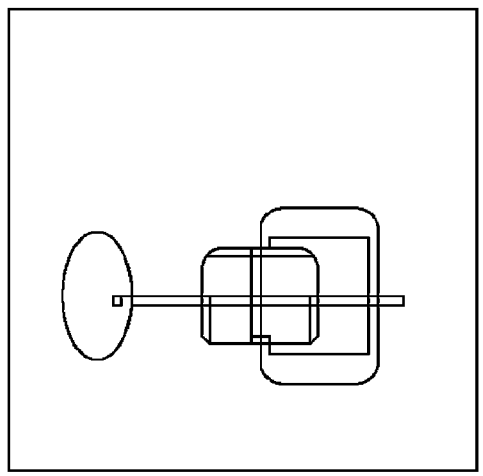

FIG. 3E illustrates a line image obtained by visualizing the artificial-vector-inserted data generated by the artificial-vector-inserted data generator 320.

The vector-data smoothing unit 330 performs the smoothing (function approximation) process for each of the vector sequences included in the artificial-vector-inserted data that is generated by the artificial-vector-inserted data generator 320. Accordingly, smoothed (function-approximated) artificial-vector-inserted vector (circumference) data (hereinafter simply called "smoothed vector data") is obtained.

A smoothed-vector-data identifying unit 340 receives the smoothed artificial-vector-inserted data and the start/end terminal-point information obtained by the artificial-vector-inserted data generator 320. Then, the smoothed-vector-data identifying unit 340 identifies the vectors corresponding to the start and end terminal points for each of the vector sequences included in the smoothed vector data, and generates non-circumference vector sequences which each connect the corresponding start terminal point and the end terminal point (i.e., which each starts at the start terminal point and ends at the end terminal point). The thus-obtained terminal-point-connecting, smoothed non-circumference vector data (hereinafter simply called "non-circumference vector data") is output through a smoothed-vector-data output unit 350 to an external device as a file or via communication I/F.

Figure 3F:
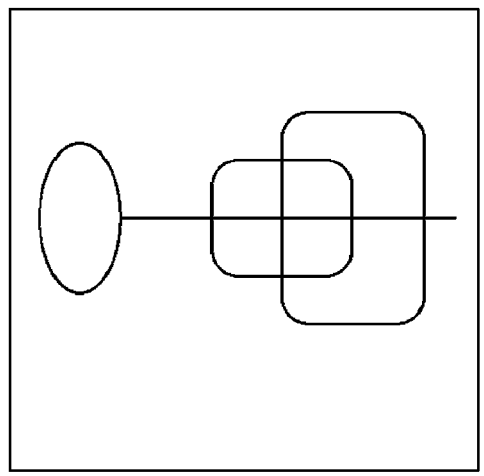

FIG. 3F illustrates a line image obtained by visualizing the non-circumference vector data generated by performing the smoothing process and the above-mentioned process for obtaining the non-circumference vector using the artificial-vector-inserted data shown in FIG. 3E.

Figure 4:
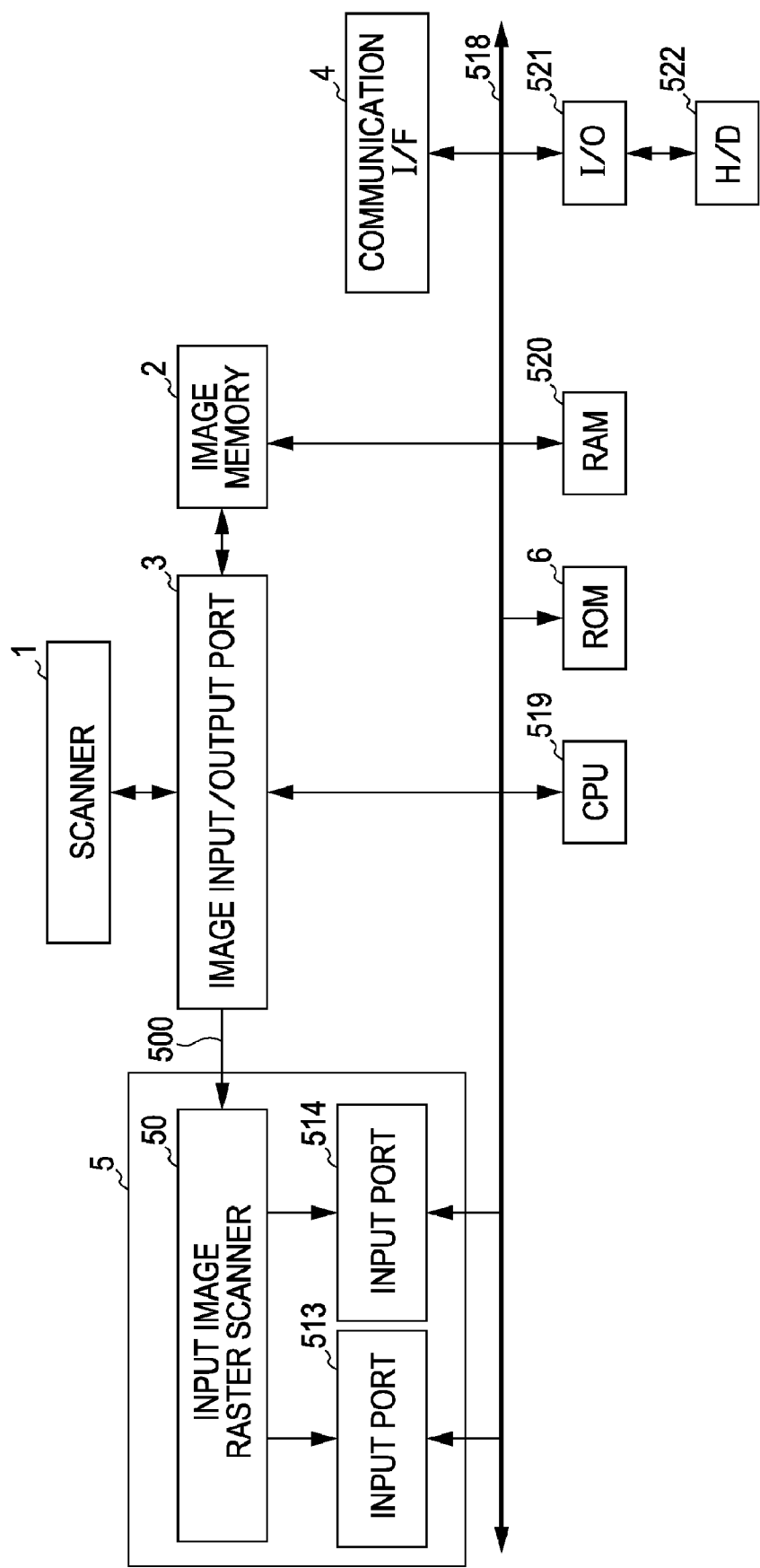
FIG. 4 is a diagram illustrating components of an image processing apparatus according to an embodiment.

FIG. 4 illustrates components of an image processing apparatus that performs the processes of the above-described functional blocks according to an embodiment. Referring to FIG. 4, the image processing apparatus includes a bus 518; a scanner 1 that functions as the image input section 211 included in the binary-image input section 210 shown in FIG. 1; an image memory 2; and an image input/output port 3. The image memory 2 receives multilevel images read by the scanner 1 via the image input/output port 3 and stores the multilevel images before the binarization process. In addition, the image memory 2 also stores binary image data obtained by the binarization process. Thus, the image memory 2 and the image input/output port 3 are included in the binary-image thinning section 220 shown in FIG. 1. The image processing apparatus also includes a contour-vector-data extractor 5 that corresponds to the contour-vector-data extractor 300 shown in FIG. 1. An input-image raster scanner 50 successively receives thinned binary image data from the image input/output port 3 through a signal line 500. Input ports 513 and 514 receive the states of nine pixels which are arranged in a 3×3 matrix so as to form a scanning window. A communication I/F 4 communicates with the outside of the system via a network or the like. The image processing apparatus further includes a CPU 519, a RAM 520 that functions as a working memory, and a ROM 6 that stores programs which are executed by the CPU 519 in accordance with the procedures described below, preset parameters and data, etc. The CPU 519, the RAM 520, and the ROM 6 function as the skeletonized-vector-data generator 310, the artificial-vector-inserted data generator 320, the vector-data smoothing unit 330, and smoothed-vector-data identifying unit 340 shown in FIG. 1. An input output (I/O) circuit 521 provides connection with a hard disc 522.

The process performed by the contour-vector-data extractor 300 will be described below with reference to FIGS. 5, 6, and 10 to 25.

In the process according to an embodiment, as shown in FIG. 6, raster scanning of a binary image is performed by moving a target pixel 101 in units of a pixel while checking the state of the target pixel 101 and the states of eight pixels surrounding the target pixel 101. Accordingly, raster scanning of the image is performed in units of a matrix of 3×3 pixels.

In FIG. 6, "X" represents the target pixel 101. Pixels indicated by "0" and "2" are at the same position as the target pixel 101 in the main-scanning direction and are on the previous and next raster lines, respectively, relative to the target pixel 101. Pixels indicated by "1" and "3" are at the previous and next positions, respectively, relative to the target pixel 101 in the main-scanning direction. Pixels indicated by "A" and "B" are at the next position relative to the target pixel 101 in the main scanning direction and are on the previous and next raster lines, respectively, relative to the target pixel 101. Pixels indicated by "C" and "D" are at the previous position relative to the target pixel 101 in the main scanning direction and are on the next and previous raster lines, respectively, relative to the target pixel 101.

Figure 5:
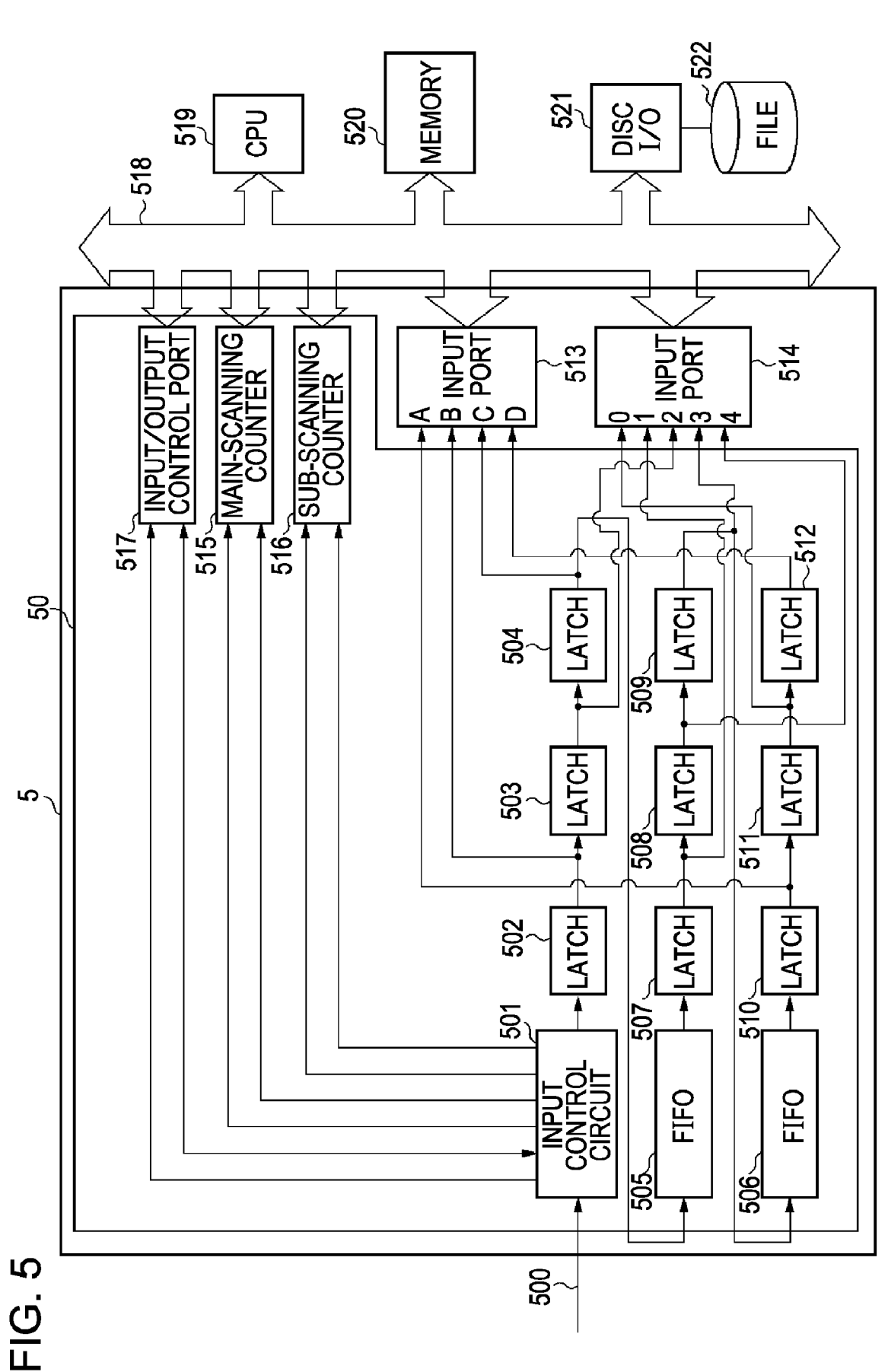
FIG. 5 is a diagram illustrating the structure of a contour-vector-data extractor according to an embodiment.

FIG. 5 is a diagram illustrating in more detail the structure of the contour-vector-data extractor 5 shown in FIG. 4 according to an embodiment. Similar to FIG. 4, in FIG. 5, the input-image raster scanner 50 sequentially receives the thinned binary image data from the image input/output port 3 via the signal line 500.

In FIG. 5, an input control (interface) circuit 501 communicates image data input via the signal line 500. The binary image data is sequentially input via the signal line 500 in the raster scanning format. A latch 502 holds the image data input from the input control circuit 501 while sequentially updating the data in units of a pixel in synchronization with a pixel synchronizing clock pulse (not shown). Each time the pixel synchronizing clock pulse is input, the latch 502 receives the next pixel data from the input control circuit 501. At the same time, the pixel data held by the latch 502 is supplied to and latched by a latch 503. In this manner, the pixel data held by the latch 503 is supplied to and latched by a latch 504 when the next pixel synchronizing clock pulse is input.

First-in first-out (FIFO) memories 505 and 506 each holds pixel data for a single raster line. The FIFO memory 505 sequentially receives the output of the latch 504 in synchronization with the pixel synchronizing clock pulse, and outputs the pixel data for the previous raster line to a latch 507. Similarly, the FIFO memory 506 receives the output of a latch 509, and outputs the pixel data for the previous raster to a latch 510. Latches 507, 508 and 509, and latches 510, 511 and 512 operate in exactly the same manner as the above-described latches 502, 503 and 504.

Thus, the latches 502, 503, 504, 507, 508, 509, 510, 511 and 512 store pixel data for nine (3×3) pixels shown in FIG. 6. More specifically, the data stored in the latches 502, 503, 504, 507, 508, 509, 510, 511 and 512 correspond to "B", "2", "C", "1", "X", "3", "A", "0" and "D", respectively, in FIG. 6.

The input ports 513 and 514 receive the states of the nine pixels arranged in a 3×3 matrix in the scanning window. The input port 513 inputs the data of the latches 510, 502, 504 and 512, that is, the data of the pixels indicated by "A", "B", "C" and "D" in FIG. 6, to the CPU 519. Similarly, the input port 514 inputs the data of the latches 511, 507, 503, 509 and 508, that is, the data of the pixels indicated by "0", "1", "2", "3" and "X" in FIG. 6, to the CPU 519.

A main-scanning counter 515 indicates the pixel position in the main scanning direction. The main-scanning counter 515 is reset by a sub-scanning synchronizing signal (not shown) and is incremented in response to a pixel synchronizing signal. A sub-scanning counter 516 indicates the pixel position in the sub-scanning direction. The sub-scanning counter 516 is reset by a page synchronizing signal (not shown) and is incremented in response to a sub-scanning synchronizing signal. An input/output control port 517 holds a signal for commanding the input control circuit 501 to execute or stop the input of pixel data, a signal transmitted from the input control circuit 501 to notify the CPU 519 of the update of pixel data, etc. The input/output circuit 521 provides connection with the hard disk 522. The input/output control port 517, the main-scanning counter 515, the sub-scanning counter 516, the input ports 513 and 514, the memory 520, and the I/O circuit 521 are connected to the CPU 519 via the bus 518.

Thus, the CPU 519 can update the pixel data via the input/output control port 517 and check the position (i, j) of the target pixel through the main-scanning counter 515 and the sub-scanning counter 516. The CPU 519 can also check the states of the target pixel and the pixels adjacent thereto in the eight directions via the input ports 513 and 514.

After the target pixel is processed, the CPU 519 issues a command to update the pixel data stored in the nine latches via the input/output control port 517, and resets a signal indicating the completion of the update. When the input control circuit 501 receives the command to update the pixel data is input, the input control circuit 501 clears this command and updates the pixel data in the latches. Then, after the pixel data are updated, the input control circuit 501 outputs a signal indicating the completion of the update to the input/output control port 517.

After outputting the command to update the pixel data, the CPU 519 waits for the signal indicating the completion of the update to be input from the input/output control port 517. When the signal indicating the completion of the update is input, the pixel data that are newly stored in the nine latches are processed. These steps are repeated until the last pixel in the image region is processed as the target pixel, and then the input control circuit 501 outputs an end signal to the input/output control port 517.

A process performed in accordance with the states of the target pixel and the eight pixels adjacent thereto will be described below. If the target pixel is a white pixel, the process is terminated and raster scanning is continued by moving the scanning window by one pixel and updating the target pixel. When the target pixel is a black pixel, the following process is performed in accordance with the states of the pixels adjacent thereto.

FIGS. 10 to 25 illustrate the contour vectors extracted in accordance with the states of the pixels adjacent to the target pixel. In FIGS. 10 to 25, relatively large circles filled with a checker pattern show black pixels, and relatively large blank circles drawn by dashed lines show white pixels. In addition, "d" stands for "do not care", which means that a pixel indicated by "d" may either be a white pixel or a black pixel.

In each of the pixel matrices shown in FIGS. 10 to 25, the black and white circles show the points that function as the start points of horizontal vectors and the end points of vertical vectors. In addition, the black and white triangles show the points that function as the start points of vertical vectors and the end points of horizontal vectors. The solid arrows connecting the start and end points show contour vectors whose start and end points are both determined and which extend in the directions indicated by the arrows. The dashed arrows show contour vectors having only one of the start and end points determined and extending in the directions indicated by the arrows. The start and end points of the contour vectors are hereinafter called "contour points".

The black circles and the black rectangles show the points that function as the start and end points of the vectors at terminal-point portions. More specifically, the black circles show the points that function as the start points of horizontal vectors and the end points of vertical vectors positioned at terminal-point portions. Similarly, the black triangles show the points that function as the start points of vertical vectors and the end points of horizontal vectors positioned at terminal-point portions.

Each of the contour points shown in FIGS. 10 to 25 has contour-point information similar to those shown in the table of FIG. 9 as additional information. The contour-point information functions as the additional information that is extracted together with the contour points.

In FIG. 9, sixteen kinds of contour-point information No. 01 to 16, according to an embodiment, are shown in the form of "xxx_yyy_zzz" or "xxx_yyy". In the contour-point information, "xxx" shows the direction of the vector that ends at the corresponding contour point and "yyy" shows the direction of the vector that starts at the corresponding contour point. The upward direction is expressed as UP, the downward direction is expressed as DOWN, the rightward direction is expressed as RIGHT, and the leftward direction is expressed as LEFT. For example, Nos. 01 to 03 correspond to contour points that function as end points of upward vectors and start points of rightward vectors.

Figure 7A:
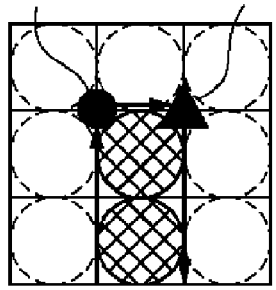
FIGS. 7A to 7D are diagrams illustrating examples of contour points extracted from terminal points and contour-point information attached to the contour points.
Figure 7B:
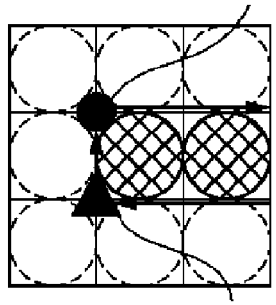
Figure 7C:
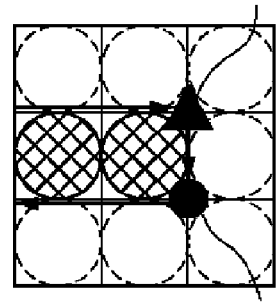
Figure 7D:
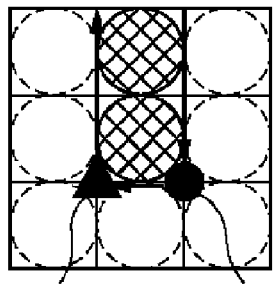
Figure 8A:
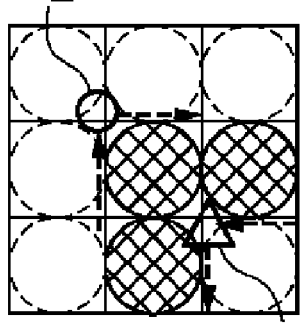
FIGS. 8A to 8D are diagrams illustrating examples of contour points detected at portions other than the terminal points and contour-point information attached to the contour points.
Figure 8B:
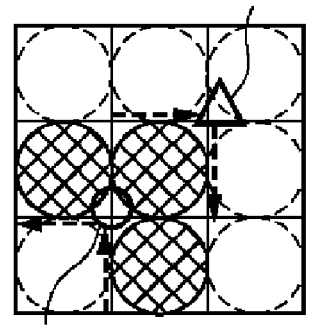
Figure 8C:
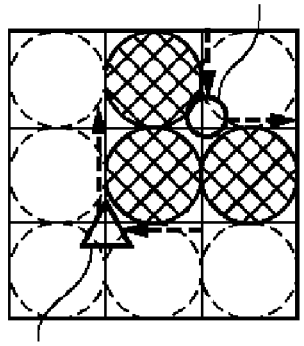
Figure 8D:
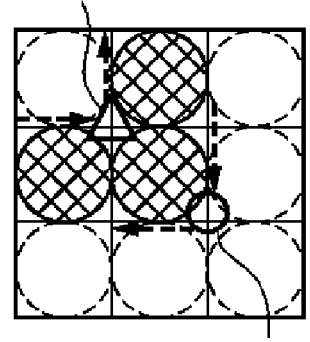
Figure 10:
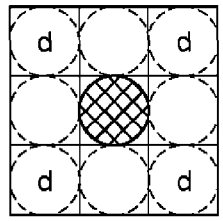
FIG. 10 is a diagram illustrating an example of an extraction pattern (case 0) of contour points and contour-point information in accordance with the states of the target pixel and the pixels adjacent to the pixel in the contour-vector-data extraction process.
Figure 11:
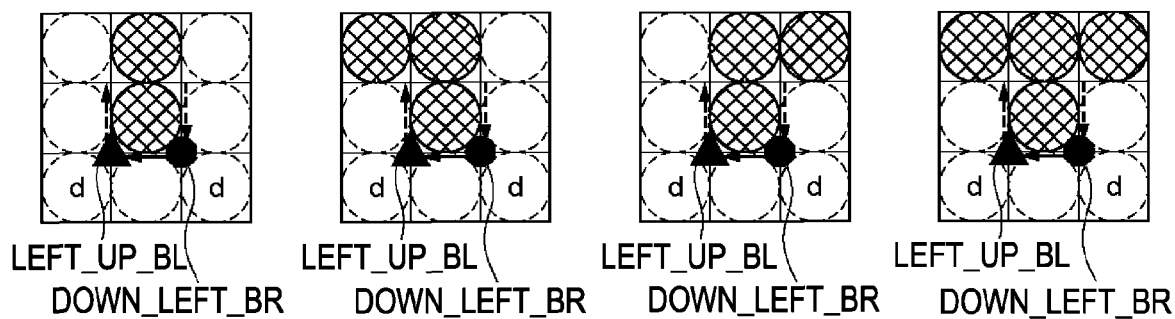
FIG. 11 is a diagram illustrating examples of extraction pattern (case 1) of contour points and contour-point information in accordance with the states of the target pixel and the pixels adjacent to the pixel in the contour-vector-data extraction process.
Figure 12:
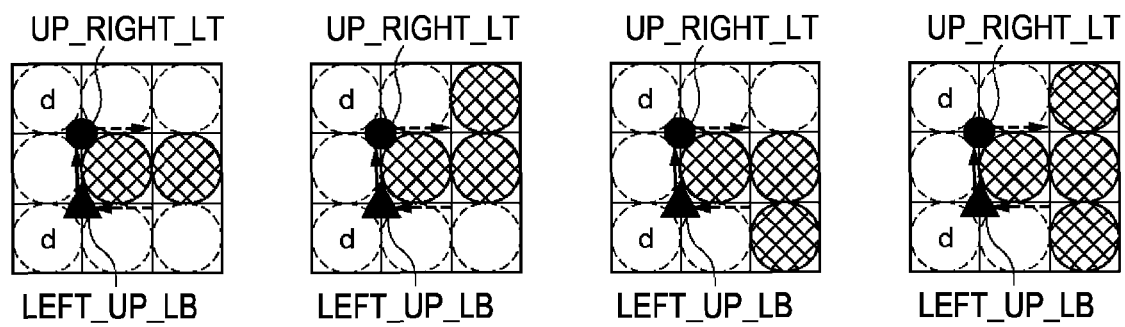
FIG. 12 is a diagram illustrating examples of extraction pattern (case 2) of contour points and contour-point information in accordance with the states of the target pixel and the pixels adjacent to the pixel in the contour-vector-data extraction process.
Figure 13:
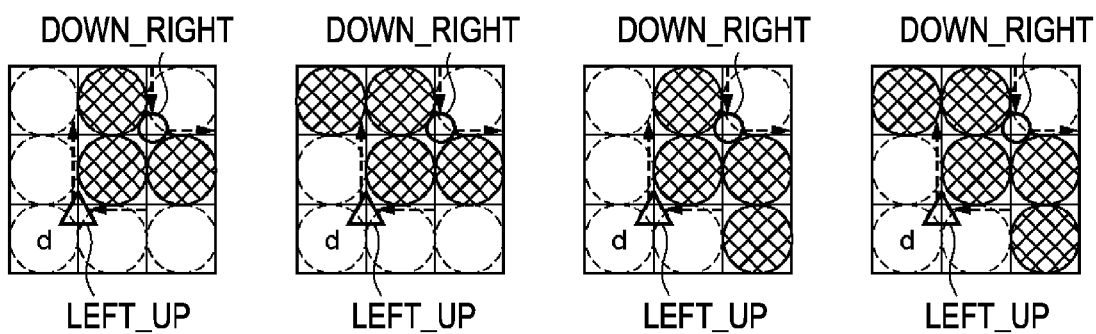
FIG. 13 is a diagram illustrating examples of extraction pattern (case 3) of contour points and contour-point information in accordance with the states of the target pixel and the pixels adjacent to the pixel in the contour-vector-data extraction process.
Figure 14:
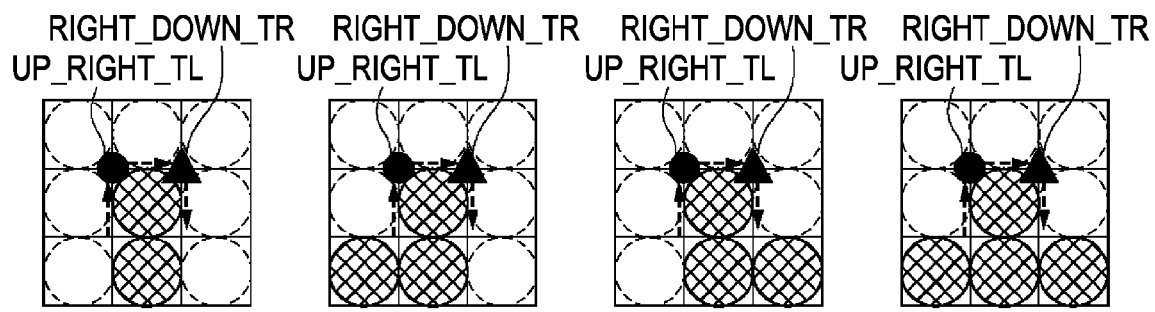
FIG. 14 is a diagram illustrating examples of extraction pattern (case 4) of contour points and contour-point information in accordance with the states of the target pixel and the pixels adjacent to the pixel in the contour-vector-data extraction process.
Figure 15:
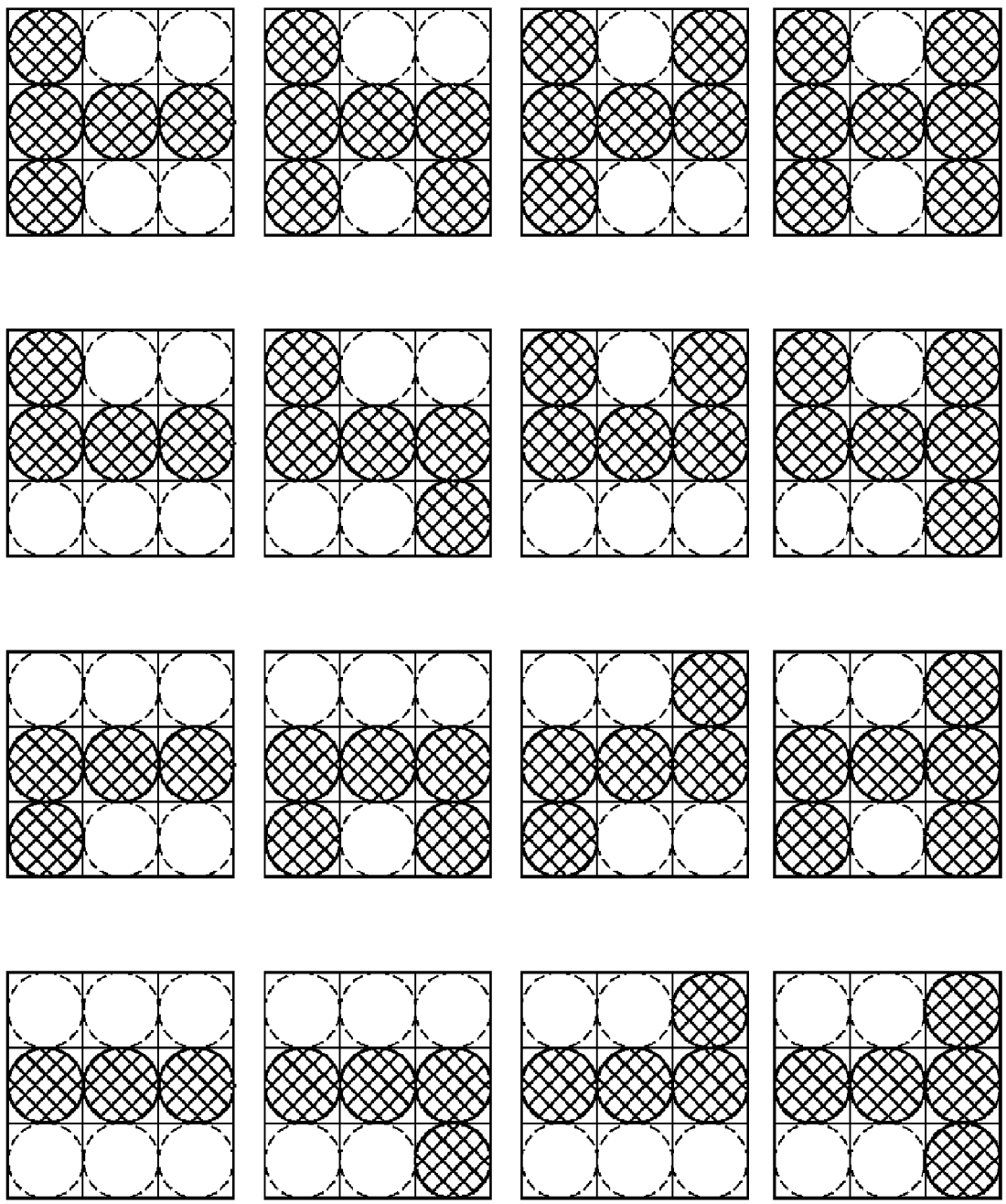
FIG. 15 is a diagram illustrating examples of extraction pattern (case 5) of contour points and contour-point information in accordance with the states of the target pixel and the pixels adjacent to the pixel in the contour-vector-data extraction process.
Figure 16:
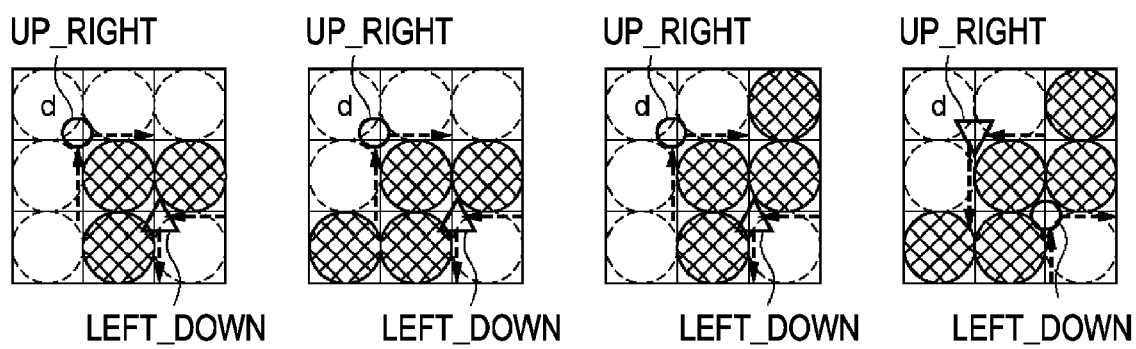
FIG. 16 is a diagram illustrating examples of extraction pattern (case 6) of contour points and contour-point information in accordance with the states of the target pixel and the pixels adjacent to the pixel in the contour-vector-data extraction process.
Figure 17:
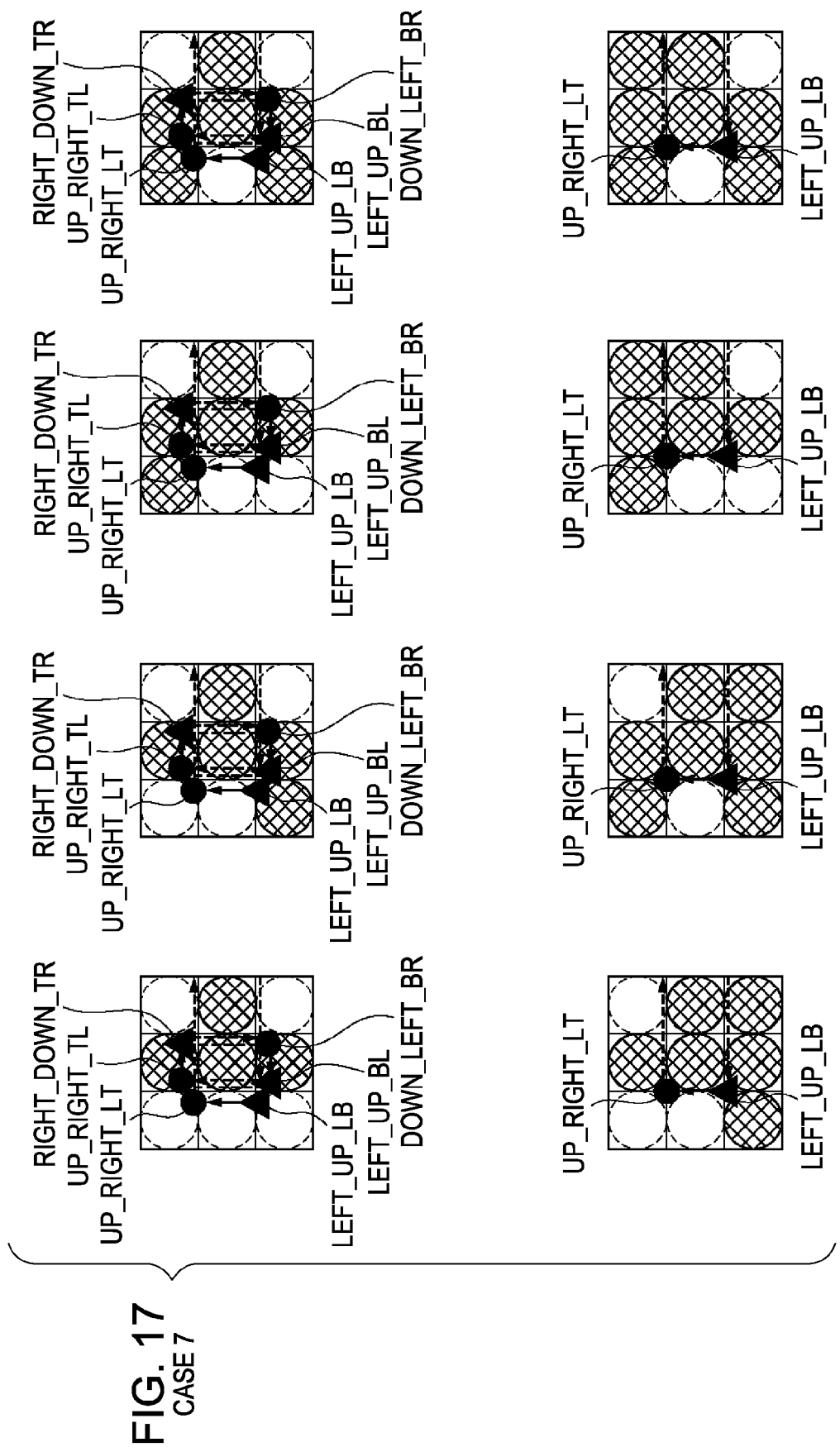
FIG. 17 is a diagram illustrating examples of extraction pattern (case 7) of contour points and contour-point information in accordance with the states of the target pixel and the pixels adjacent to the pixel in the contour-vector-data extraction process.
Figure 18:
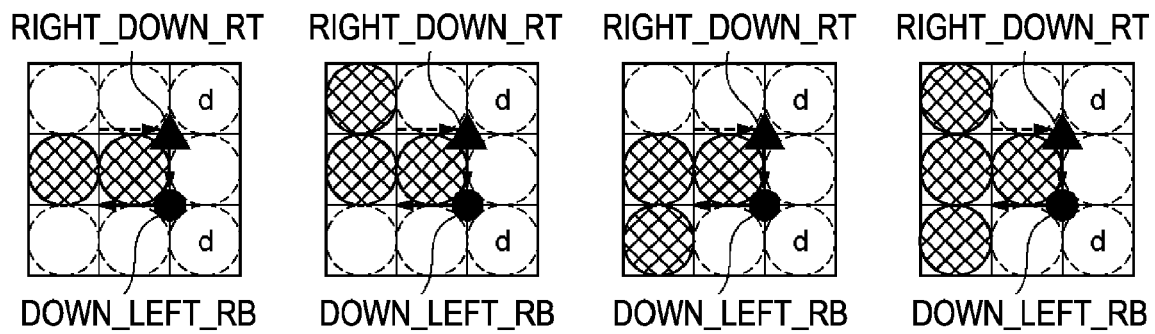
FIG. 18 is a diagram illustrating examples of extraction pattern (case 8) of contour points and contour-point information in accordance with the states of the target pixel and the pixels adjacent to the pixel in the contour-vector-data extraction process.
Figure 19:
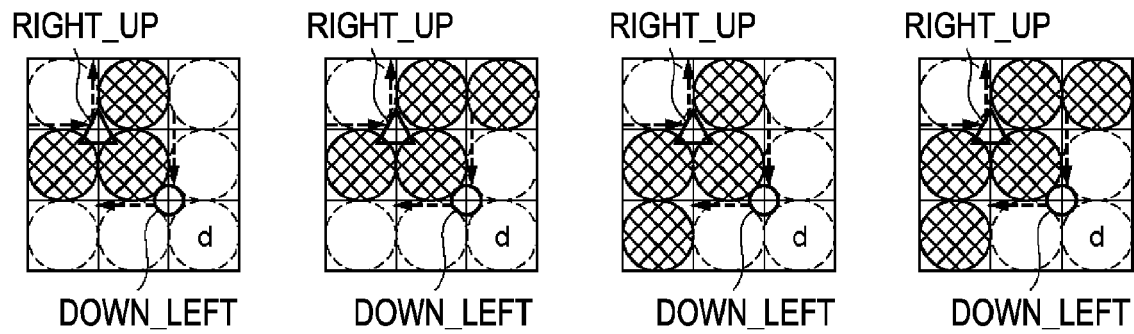
FIG. 19 is a diagram illustrating examples of extraction pattern (case 9) of contour points and contour-point information in accordance with the states of the target pixel and the pixels adjacent to the pixel in the contour-vector-data extraction process.
Figure 21:
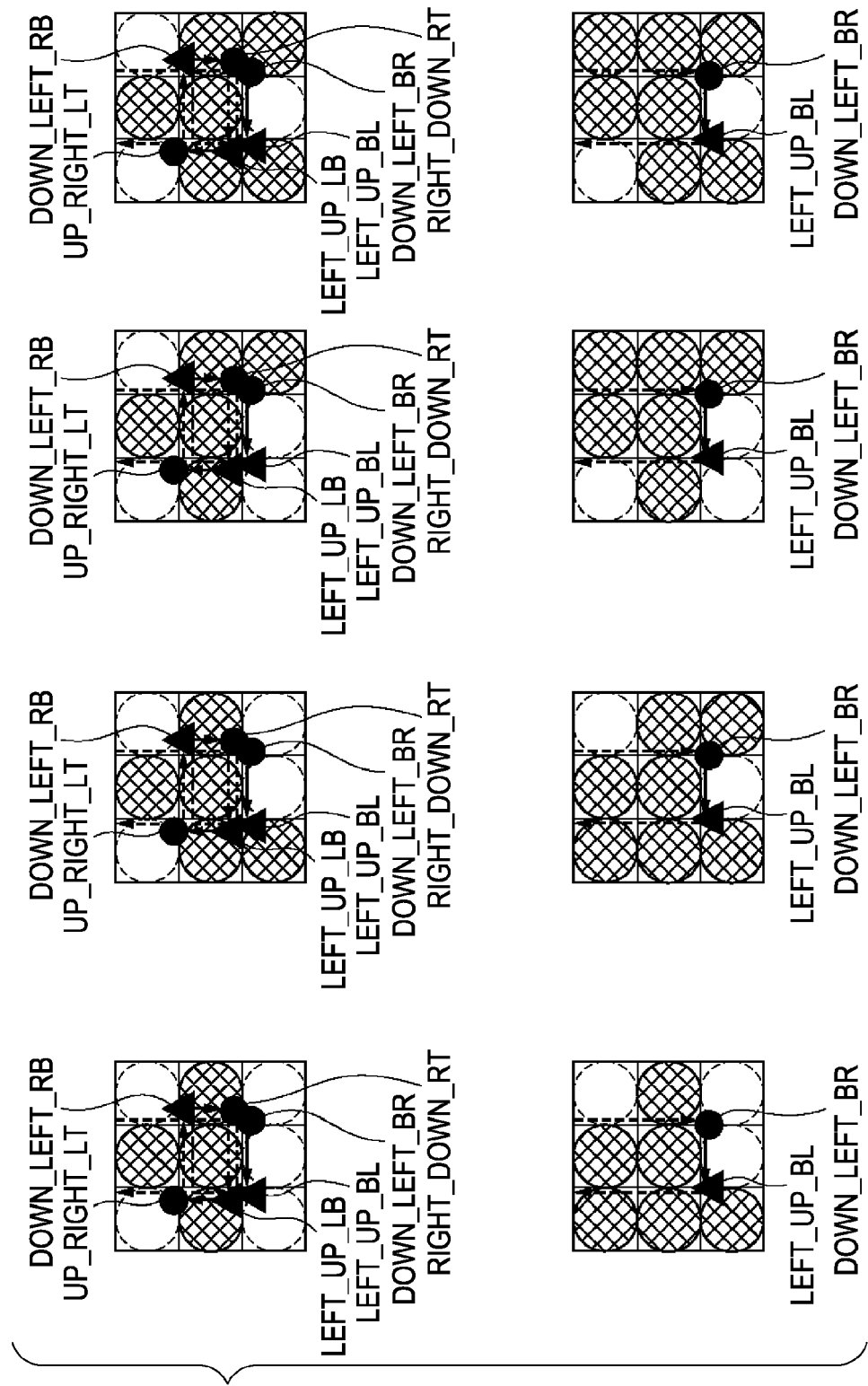
FIG. 21 is a diagram illustrating examples of extraction pattern (case 11) of contour points and contour-point information in accordance with the states of the target pixel and the pixels adjacent to the pixel in the contour-vector-data extraction process.
Figure 22:
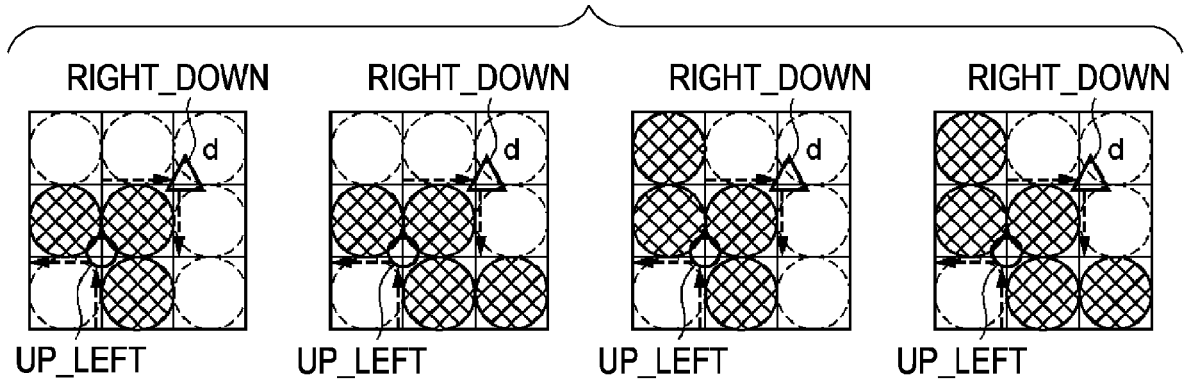
FIG. 22 is a diagram illustrating examples of extraction pattern (case 12) of contour points and contour-point information in accordance with the states of the target pixel and the pixels adjacent to the pixel in the contour-vector-data extraction process.
Figure 23:
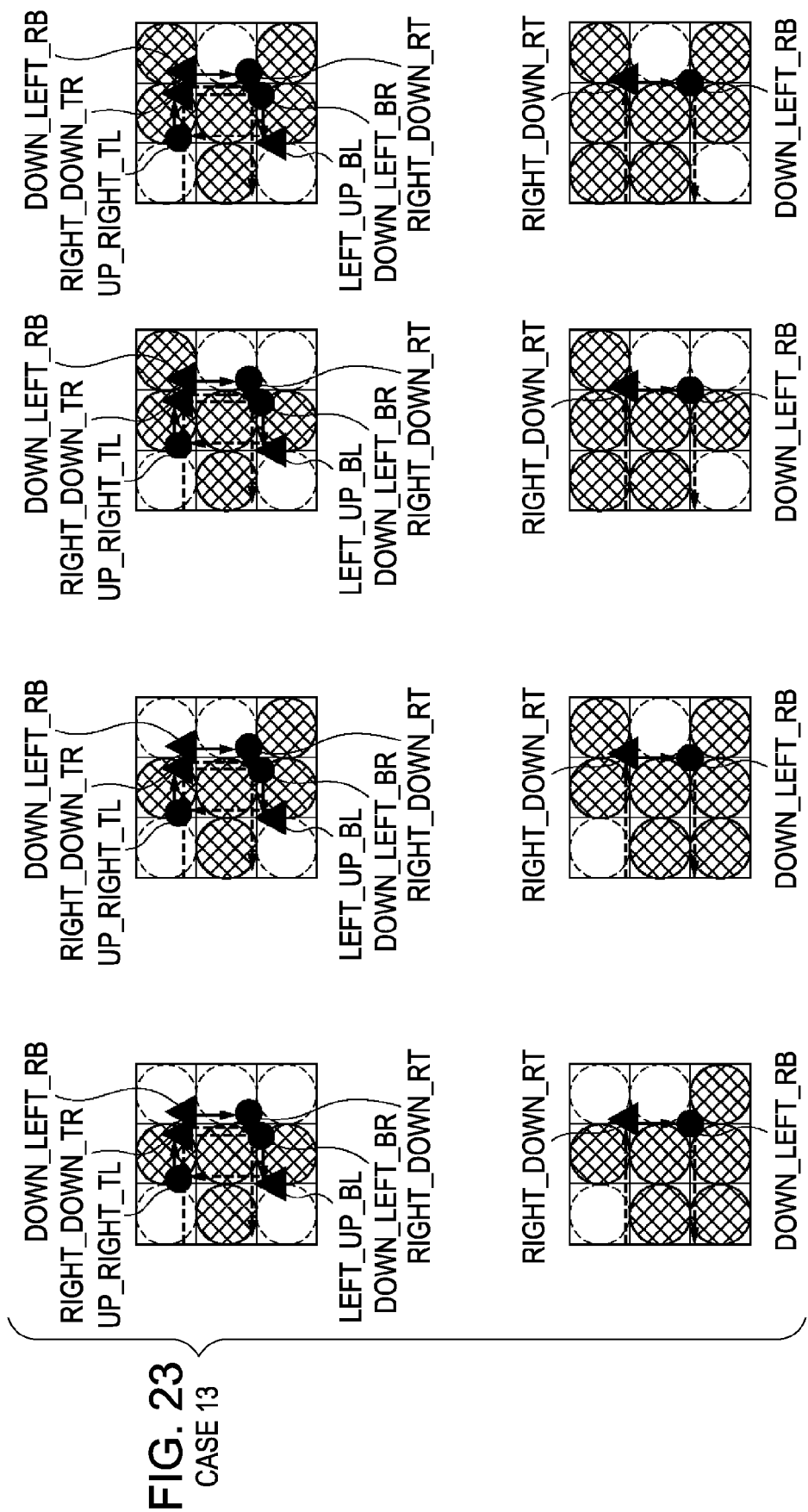
FIG. 23 is a diagram illustrating examples of extraction pattern (case 13) of contour points and contour-point information in accordance with the states of the target pixel and the pixels adjacent to the pixel in the contour-vector-data extraction process.
Figure 24:
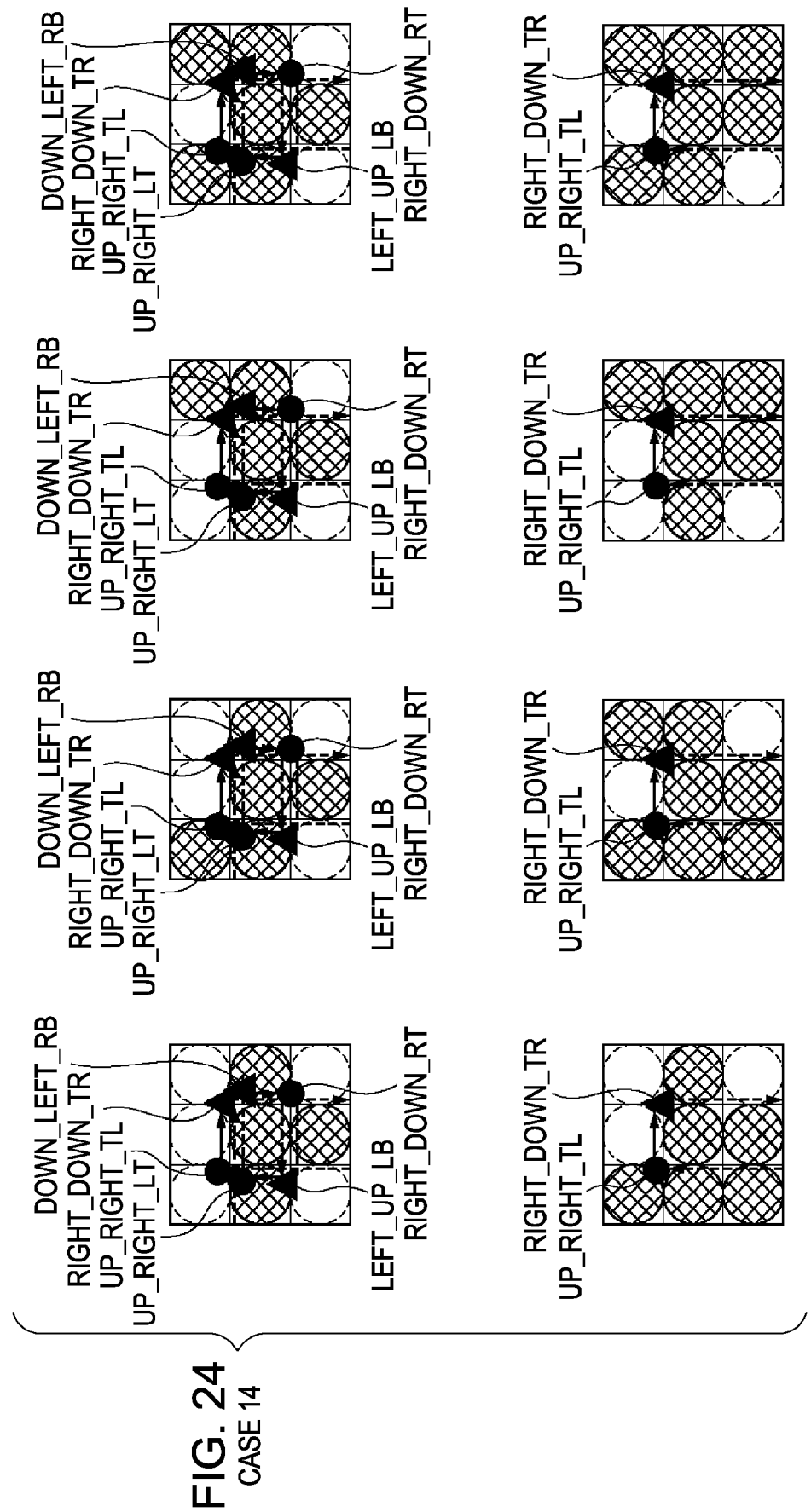
FIG. 24 is a diagram illustrating examples of extraction pattern (case 14) of contour points and contour-point information in accordance with the states of the target pixel and the pixels adjacent to the pixel in the contour-vector-data extraction process.
Figure 25:
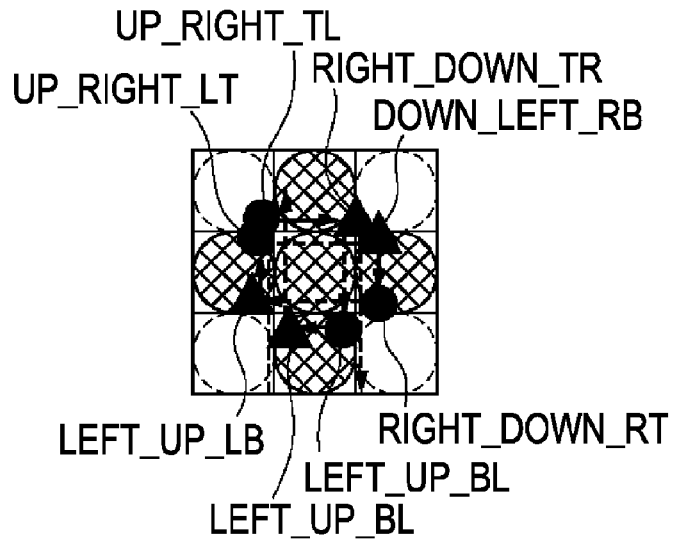
FIG. 25 is a diagram illustrating examples of extraction pattern (case 15) of contour points and contour-point information in accordance with the states of the target pixel and the pixels adjacent to the pixel in the contour-vector-data extraction process.

In the contour-point information, "_zzz" indicates that the corresponding contour point is extracted from a terminal-point portion. Information regarding the terminal-point portion is shown in the "terminal point information" column in FIG. 9. More specifically, "_TL" shows that the corresponding contour point is at the left corner of a top end portion (Top Left) of a line element (see FIG. 7A). Similarly, "_LT" shows that the corresponding contour point is at the top corner of a left end portion (Left Top) of a line element (see FIG. 7B); "_BR" shows that the corresponding contour point is at the right corner of a bottom end portion (Bottom Right) of a line element (see FIG. 7D); "_RB" shows that the corresponding contour point is at the bottom corner of a right end portion (Right Bottom) of a line element (see FIG. 7C); "_LB" shows that the corresponding contour point is at the bottom corner of a left end portion (Left Bottom) of a line element (see FIG. 7B); "_BL" shows that the corresponding contour point is at the left corner of a bottom end portion (Bottom Left) of a line element (see FIG. 7D); "_RT" shows that the corresponding contour point is at the top corner of a right end portion (Right Top) of a line element (see FIG. 7C); and "_TR" shows that the corresponding contour point is at the right corner of a top end portion (Top Right) of a line element (see FIG. 7A). The contour-point information without "_zzz" is attached to contour points extracted from portions other than the terminal-point portions. Examples of the contour points extracted from portions other than the terminal-point portions are shown in FIGS. 8A to 8D. In the actual process of extracting the contour points and the additional information on the basis of the states of the pixels adjacent to the target pixel, as shown in FIGS. 10 to 25, values shown in the "value" column in FIG. 9 are extracted as the contour-point information.

In FIGS. 8A to 8D, black pixels are shown by circles filled with a checker pattern and white pixels are shown by blank circles drawn by dashed lines. The start and end points of the contour vectors are positioned between the adjacent pixels in both the main-scanning direction and the sub-scanning direction. The positions of the pixels are expressed by two-dimensional coordinates using positive integers in both the main-scanning and sub-scanning directions. To avoid the use of decimals, in the following description, the pixel positions are expressed using only even numbers and the positions of the start and end points of the contour vectors are expressed using odd integers.

Accordingly, an image having m pixels in the main-scanning direction and n pixels in the sub-scanning direction is expressed by coordinates of 2m×2n positive even integers. Thus, if the pixel positions are expressed by two-dimensional coordinates in which the x coordinate is the main-scanning direction and the y coordinate is the sub-scanning direction and the binary image has m×n pixels including n raster lines which each include m pixels (m and n are positive integers), the position of the $i^{th}$ pixel in the $j_{th}$ raster line is expressed as (2i, 2j) (i and j are integers that satisfy i≦m and j≦n). The main-scanning direction (x coordinate) is positive in the direction from left to right, and the sub-scanning direction (y coordinate) is positive in the direction from top to bottom.

The operation performed by the contour-vector-data extractor 300 will be described below with reference to the flowcharts shown in FIGS. 26 to 28.

According to an embodiment, a binary image that is thinned on the basis of 4-connected pixels is divided into closed curves and independent line elements connecting the terminal points and intersections by detecting the terminal points and intersections. Then, a vector sequence is extracted for each of the closed curves and line elements, and the contour points are also extracted together with the contour-point information. Therefore, the functions of the operations performed in embodiments of the present invention are largely different from that described in U.S. Pat. No. 6,404,921.

As shown in FIGS. 10 to 25, the pixel pattern group of the pixel matrix (3×3 pixels) used in the operation is also different from that described in U.S. Pat. No. 6,404,921. The extracting operation of an embodiment of the present invention is similar to the extracting operation discussed in U.S. Pat. No. 6,404,921 in that an image is raster scanned using a scanning window of nine pixels arranged in 3×3 matrix and the contour points are extracted by checking the states of the target pixel and eight pixels adjacent thereto. However, the operation of an embodiment of the present invention differs from that discussed in U.S. Pat. No. 6,404,921 in that the contour points and the contour-point information are extracted in accordance with the pixel pattern of 3×3 pixels.

Figure 26:
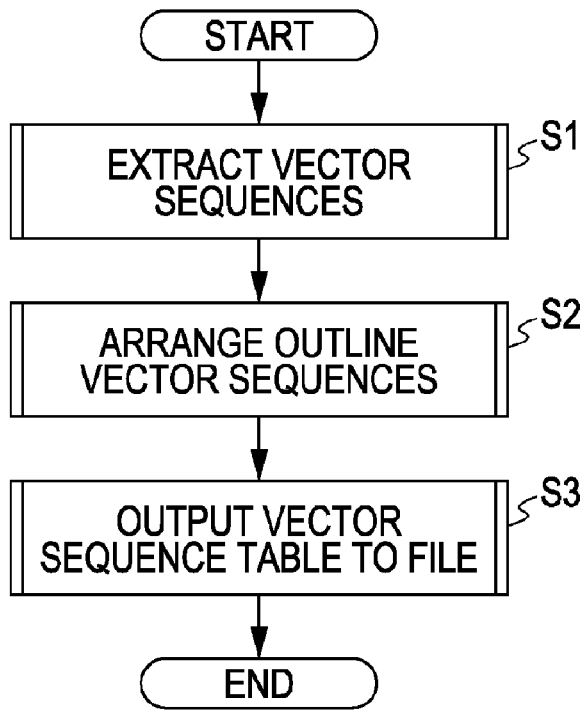
FIG. 26 is a flowchart illustrating the overall operation of a contour vector data extraction process according to an embodiment.

FIG. 26 is a flowchart showing the overall operation of a contour extraction process performed by the CPU 519 in the image processing apparatus according to an embodiment. First, in step S1, vector sequences are extracted from binary image data together with contour-point information for each of the contour points. Then, for each vector, the coordinates of the start point, a vector ending at that vector (i.e., a vector whose end point coincides with the start point of that vector), and a vector starting at that vector (i.e., a vector whose start point coincides with the end point of that vector) are output.

Figure 29:
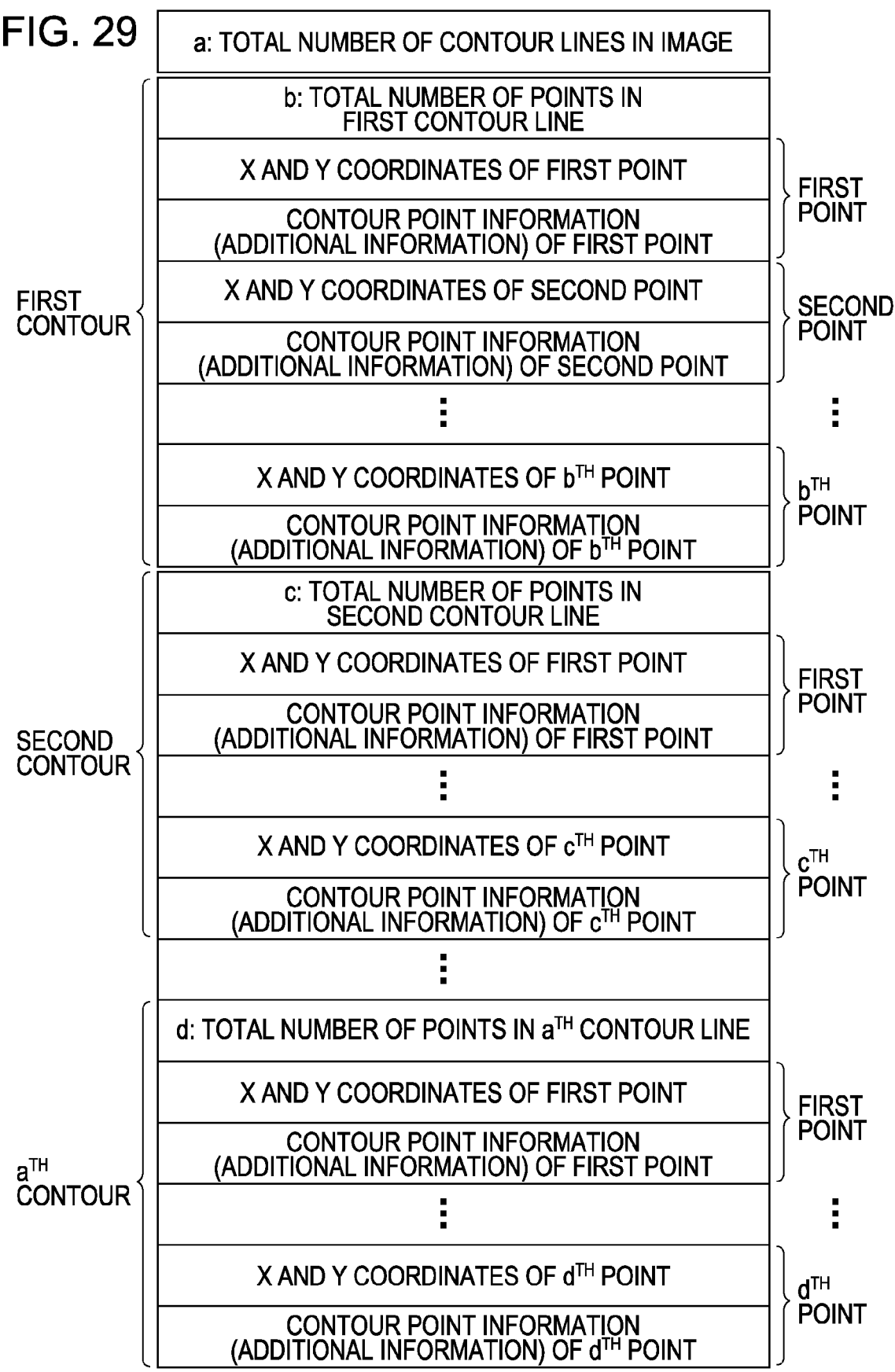
FIG. 29 is a diagram illustrating an example of a data format of contour vector sequences and contour-point information according to an embodiment.

Then, in step S2, a table shown in FIG. 29 is generated using the vectors ending at and starting at each vector. The table stores the combination of the total number of contour lines (the total number of line elements) in the image, the total number of contour points in each contour line, the x and y coordinates of each contour point in each contour line, and the contour-point information for each contour point.

Then, the process proceeds to step S3, where the table is stored in the disk 522 through the disc I/O 521 in the file format. Then, the process is finished.

Figure 27:
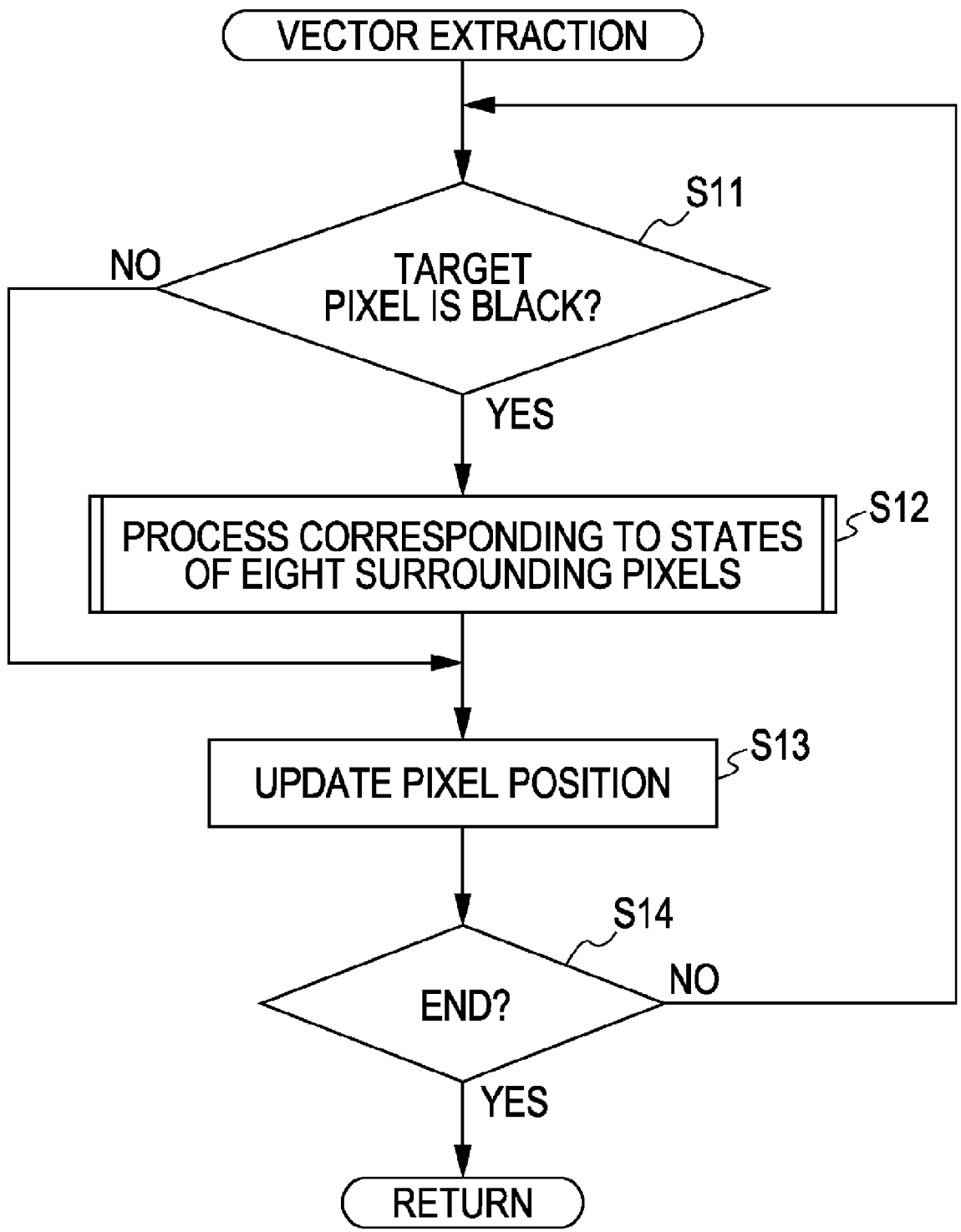
FIG. 27 is a flowchart of a vector sequence extraction process according to an embodiment.

FIG. 27 is a flowchart showing the vector-sequence extraction process performed in step S1 of FIG. 26. First, in step S11, it is determined whether the target pixel is black or white by checking bit 4 (the target pixel "X") of the input port 514. If the target pixel is white (NO in step S11), the process proceeds to step S13. If the target pixel is black (YES in step S11), the process proceeds to step S12. In step S12, the states of the eight pixels surrounding the target pixel are checked and a processing routine corresponding to the thus checked states is called. Accordingly, the contour vectors are extracted.

In step S13, a command to update the pixel position is issued via the input/output control port 517, as described above. Then, when the signal indicating the completion of the update is input from the input/output control port 517, the process proceeds to step S14, where it is determined whether or not the last pixel has been processed on the basis of a signal from the input/output control port 517. If the result of the determination in step S14 is "NO", the process returns to step S11 and the above-described operations are performed for the next target pixel. If the result of the determination in step S14 is "YES", the process returns to the routine shown in FIG. 26.

Figure 28:
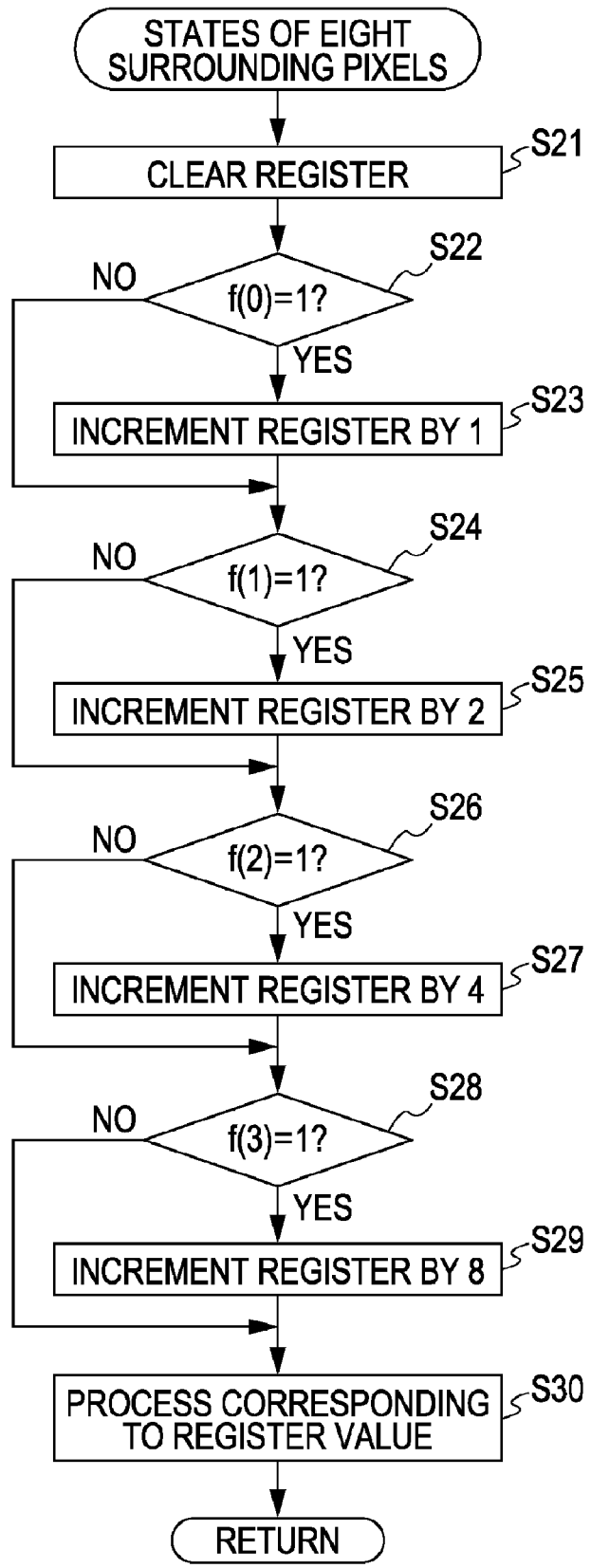
FIG. 28 is a flowchart of a process performed in the vector sequence extraction process according to an embodiment.

FIG. 28 is a flowchart showing the process performed in accordance with the states of the eight surrounding pixels in step S12 of FIG. 27 according to an embodiment.

In step S21, the register of the CPU 519 is cleared to "0". Then, the process proceeds to step S22, where it is determined whether the state of the pixel at the position indicated by "0" in FIG. 6 (hereinafter represented by f(0)) is black (hereinafter represented by "1") or white (hereinafter represented by "0"). If the pixel is black (f(0)=1), the process proceeds to step S23. If the pixel is white (f(0)=0), the process proceeds to step S24.

In step S23, the register is incremented by 1.

Then, the process proceeds to step S24, where it is determined whether the pixel at the position indicated by "1" in FIG. 6 is black (f(1)=1) or white (f(1)=0). If f(1)=1, the process proceeds to step S25, where the register is incremented by 2. If f(1)=0, the process proceeds to step S26, where it is determined whether the pixel at the position indicated by "2" in FIG. 6 is black or white. If f(2)=1 (black), the process proceeds to step S27, where the register is incremented by 4.

Then, the process proceeds to step S28, where a similar determination is made for the pixel at the position indicated by "3" in FIG. 6. If f(3)=1, the process proceeds to step S29, where the register is incremented by 8. Otherwise, the process proceeds to step S30. In step S30, a routine having a process number that corresponds to the value of the register is called.

The value of the register is set to one of 0 to 15 in accordance with the states of the pixels at positions indicated by "0", "1", "2" and "3" in FIG. 1. These values (0 to 15) of the register correspond to cases 0 to 15 shown in FIGS. 10 to 25, respectively.

In step S30 shown in FIG. 28, the contour points and the contour-point information defined as shown in FIGS. 10 to 25 are extracted in accordance with the case. Accordingly, in a single raster scanning process of the binary image (line diagram) thinned on the basis of 4-connected pixels and including terminal points and intersections, the contour-vector-data extractor 300 extracts a group of vector sequences (line-element coarse contour vector data), the vector sequences correspond to the closed curves and independent lines connecting the terminal points and intersections. In addition, the contour-vector-data extractor 300 also extracts the contour-point information, and outputs the obtained process result. The process result is output, for example, in the form shown in FIG. 29. Referring to FIG. 29, the vector sequences extracted from the respective line elements are expressed in units of a contour line (the first contour line, the second contour line, the $a^{th}$ contour line, etc.), and the contour-point information is attached to each of the contour points included in each vector sequence.

Figure 31:
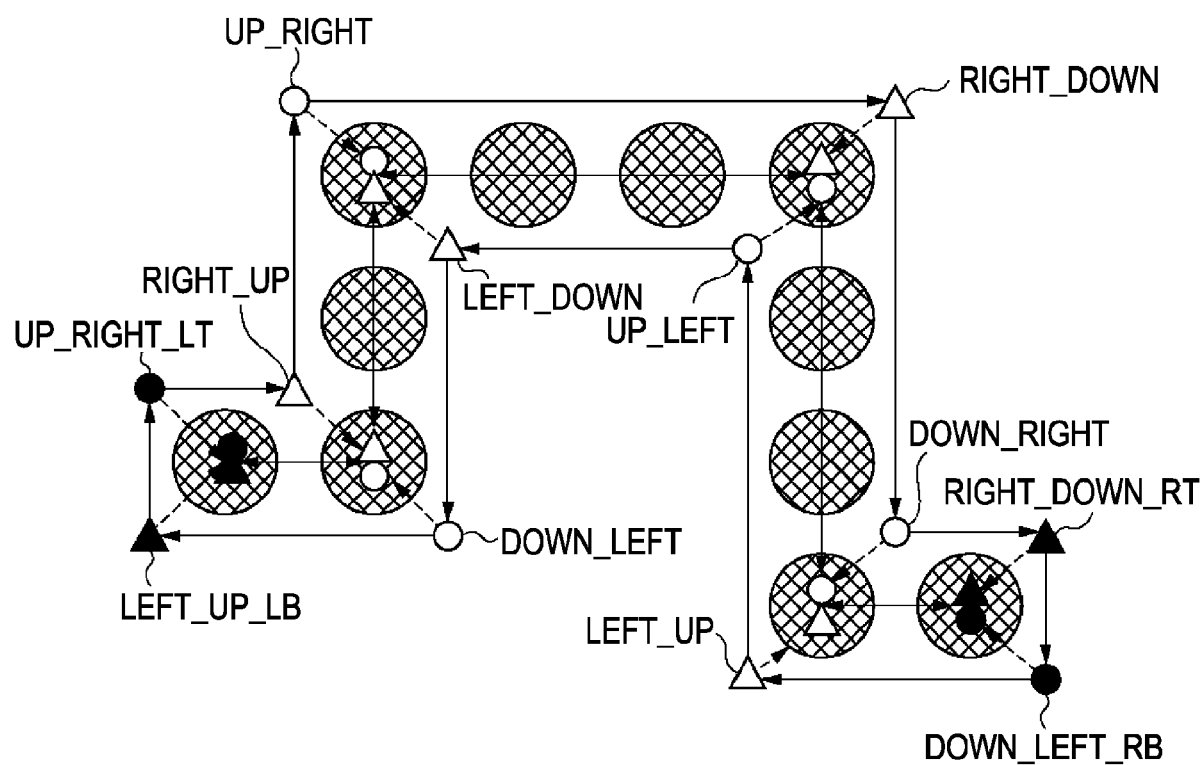
FIG. 31 is a diagram illustrating an example of a line element, a contour vector data sequence, contour-point information, and a skeletonized vector sequence.

FIG. 31 shows an example of a line drawing and contour vector data, that is, the combination of the line-element coarse contour vector data (vector sequence surrounding the thinned line element) and the contour-point information.

Figure 30:
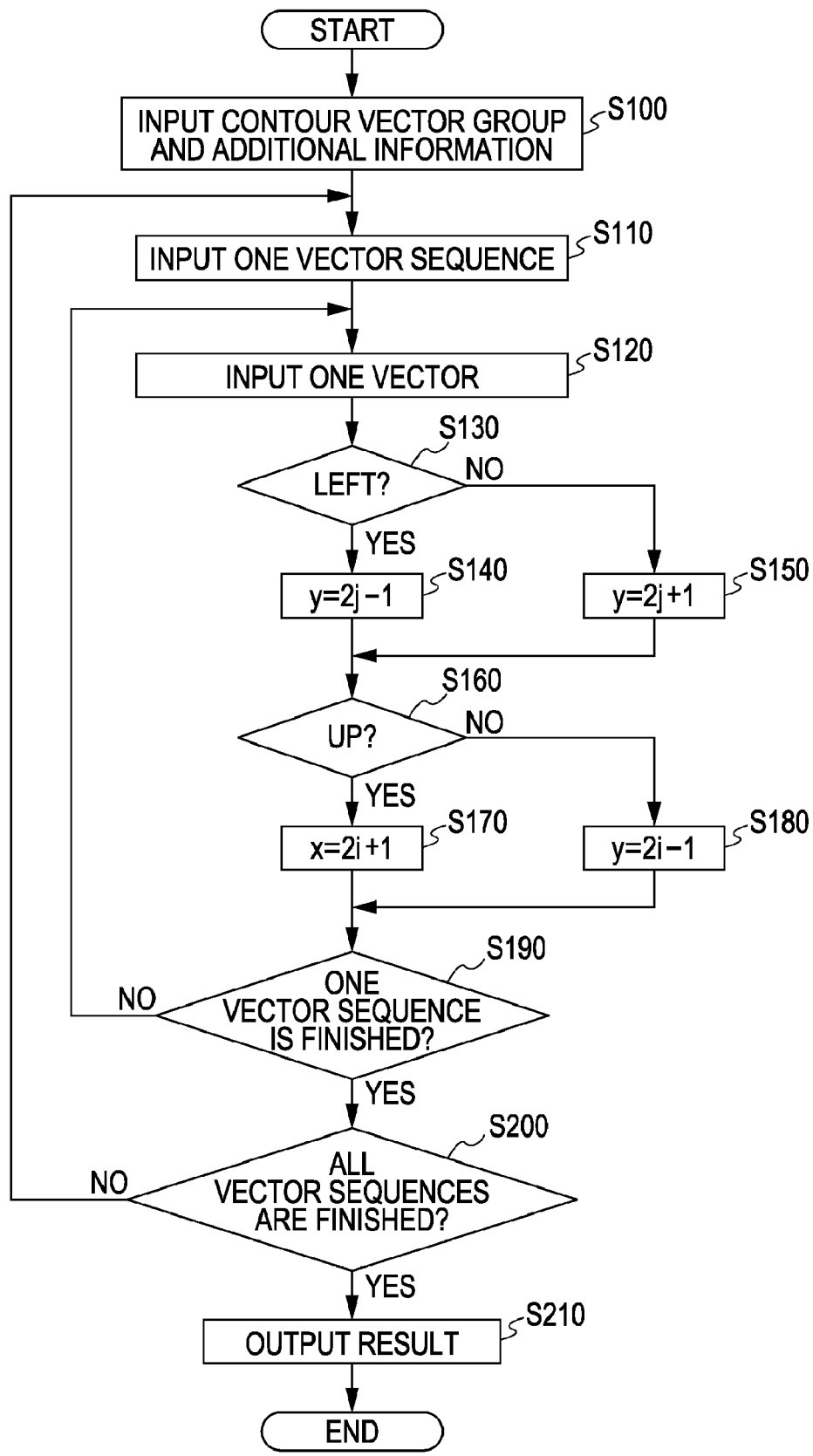
FIG. 30 is a flowchart of a process performed by the skeletonized-vector-data generator according to an embodiment.

The process performed by the skeletonized-vector-data generator 310 according to an embodiment will be described below with reference to the flowchart shown in FIG. 30. Referring to FIG. 30, when the process is started, the contour vector data obtained by the contour-vector-data extractor 300 is input in step S100. The thus-input contour vector data includes information (additional information) indicating whether or not each vector is extracted from a portion corresponding to a terminal point (or an intersection) of the line drawing and a group of vector sequences (line-element course contour vector data) which each correspond to one of the line elements (individual lines and closed curves) connecting the terminal points and intersections.

Then, in step S110, from the vector sequences included in the contour vector data that is input in Step 100 in the format shown in, for example, FIG. 29, the $k^{th}$ vector sequence ($k^{th}$ contour line in FIG. 29 ($1 \leq k \leq a$)) is selected as a current process target. Here, k is incremented each time step S110 is executed.

Then, in step S120, from the contour points of the vectors included in the vector sequence selected in step S110 (the total number of contour points is, for example, p), the $q^{th}$ contour point ($1 \leq q \leq p$) is selected as a current process target. Here, q is incremented each time step S120 is executed.

Then, in step S130, by referring to the contour-point information of the contour point selected in step S120, it is determined whether or not either a vector ending at this contour point or a vector starting at this contour point extends leftward (LEFT). If the result of the determination in step S130 is "YES", the process proceeds to step S140. If the result of the determination in step S130 is "NO", the process proceeds to step S150.

In step S140, the y coordinate of the contour point (coordinates ($2i$, $2j$)) is reduced by 1 (the position thereof is shifted toward the origin by a half pixel in the sub-scanning direction). Then, the process proceeds to step S160.

In step S150, the y coordinate of the contour point is increased by 1 (the position thereof is shifted away from the origin by a half pixel in the sub-scanning direction). Then, the process proceeds to step S160.

In step S160, by referring to the contour-point information of the contour point, it is determined whether or not either a vector ending at this contour point or a vector starting at this contour point extends upward (UP). If the result of the determination in step S160 is "YES", the process proceeds to step S170. If the result of the determination in step S160 is "NO", the process proceeds to step S180.

In step S170, the x coordinate of the contour point is increased by 1 (the position thereof is shifted away from the origin by a half pixel in the main-scanning direction). Then, the process proceeds to step S190.

In step S180, the x coordinate of the contour point is reduced by 1 (the position thereof is shifted toward the origin by a half pixel in the main-scanning direction). Then, the process proceeds to step S190.

In step S190, it is determined whether or not all of the contour points included in the vector sequence selected in step S110 are processed. If the result of the determination in step S190 is "YES", the process proceeds to step S200. If the result of the determination in step S190 is "NO", the process returns to step S120 to repeat the operations of steps S130 to S190.

In step S200, it is determined whether or not all of the vector sequences included in the line-element course contour vector data are processed. If the result of the determination in step S200 is "YES", the process proceeds to step S210. If the result of the determination in step S200 is "NO", the process returns to step S120 to repeat the operations of steps S120 to S200 for the next vector sequence.

In step S210, the process result for the line-element course contour vector data input in step S100 is output.

Referring to FIG. 9, values in the "value" column are used as the contour-point information. Therefore, when these values are expressed in binary numbers and bit 0 and bit 7 are the LSB and MSB, respectively, the determination in step S130 can be performed by checking bit 2 ("right (0) left (1)" column in FIG. 9). More specifically, it is determined that each contour point has a rightward vector if bit 2 is 0 and has a leftward vector if bit 2 is 1. Similarly, the determination in step S160 can be performed by checking bit 3 ("up (0) down (1)" column in FIG. 9), and each contour point has an upward vector if bit 3 is 0 and has a downward vector if bit 3 is 1.

Thus, first, the skeletonized-vector-data generator 310 receives the contour vector data from the contour-vector-data extractor 300, the contour vector data including information (additional information) indicating whether or not each vector is extracted from a portion corresponding to a terminal point (or an intersection) of the line drawing and a group of vector sequences (line-element course contour vector data) which each correspond to one of the line elements (individual lines and closed curves) connecting the terminal points and intersections. Then, fine position adjustment is performed for each of the vectors included in the vector sequences surrounding the respective one-pixel-width line elements. In the adjustment, each vector is moved by a half pixel in a corresponding direction. Accordingly, skeletonized vector data representing vector sequences surrounding zero-width line elements is generated. The skeletonized vector data can also be expressed in the format shown in FIG. 29, and is output in this format in an embodiment.

FIG. 31 shows an example of skeletonized vector data (vector sequence surrounding zero-width line element) generated on the basis of the line-element coarse contour vector data (vector sequence surrounding one-pixel-width line element) and the contour-point information.

Next, the process performed by the artificial-vector-inserted data generator 320 will be described below. The artificial-vector-inserted data generator 320 inserts artificial vectors so that portions corresponding to the terminal points can be maintained as the terminal points (be used as anchor points of Bezier curves). Accordingly, when the vector-data smoothing unit 330 performs a smoothing (function approximation) process, the positions of the terminal points can be prevented from becoming unclear due to integration of vectors corresponding to the terminal points with other vectors. The artificial-vector-inserted data generator 320 also generates the start/end terminal-point information for each of the vector sequences included in the artificial-vector-inserted data. The start/end terminal-point information is used by the smoothed-vector-data identifying unit 340 when the smoothed-vector-data identifying unit 340 identifies a start terminal point and an end terminal point for each of the vector sequences included in the smoothed vector data and generates non-circumference vector sequences connecting the start terminal point and the end terminal point.

In an embodiment, the vector-data smoothing unit 330 performs a process of smoothing the vector data in which the artificial vectors are inserted. Therefore, the smoothing process can be performed while maintaining the terminal points.

The vector smoothing (function approximation) process performed by the vector-data smoothing unit 330 according to an embodiment will be described below.

First, contour data which is extracted from data of a binary raster image and in which horizontal and vertical vectors are alternately arranged is input as coarse contour data. Then, tangential segments are extracted from the segments forming the coarse contour.

Then, anchor points are extracted from the tangential segments and each group of segments placed between the extracted anchor points is approximated with a straight line or a second or third order Bezier curve or is replaced by a second or third order Bezier curve by performing Bezier curve approximation.

A method of function approximation in which contour points placed between the anchor points are approximated on the basis of the anchor points is a basic method of function approximation. The anchor points have a characteristic that the positions (coordinates) of the anchor points do not change irrespective of whether the points between the anchor points are approximated with a second-order Bezier curve, a third-order Bezier curve, or a straight line.

The artificial-vector-inserted data generator 320 according to an embodiment sets one of the terminal points of each vector sequence included in the skeletonized vector data as a start terminal point, and sets the other one of the terminal points as an end terminal point. In addition, the artificial-vector-inserted data generator 320 inserts artificial vectors (artificial contour points) between the start and end terminal points so that the start and end terminal points function as the anchor points.

A vector can be extracted as a tangential segment when the following conditions are satisfied: (1) the vector is positioned between vectors extending in the opposite directions; (2) the vector is adjacent to a main tangential segment that is already extracted and has a length L1 that satisfies $L1 \geq \theta_1$ (parameter); (3) the vector has a length L2 that satisfies $L2 \geq \theta_2$ (parameter). The parameters $\theta_1$ and $\theta_2$ can be set to constant values depending on the resolution, or be varied as necessary depending on the object size, such as the outline size.

In the process of extracting the anchor points, new points are set on the tangential segments and are extracted as the anchor points. The anchor points are extracted from both ends of each tangential segment. Although two anchor points are basically extracted for each tangential segment, only one anchor point is extracted if two anchor points coincide with each other. When two anchor points are extracted, a straight line is automatically set for a section between the two anchor points. In a case in which only one end of a tangential segment is set as the anchor point, if vectors extracted as tangential segments are adjacent to each other, the point between the vectors is extracted as the anchor point.

The artificial-vector-inserted data generator 320 sets one of the terminal points of each vector sequence included in the skeletonized vector data as a start terminal point, and sets the other one of the terminal points as an end terminal point. In addition, the artificial-vector-inserted data generator 320 inserts artificial points so that the start and end terminal points function as the anchor points.

Figure 32A:
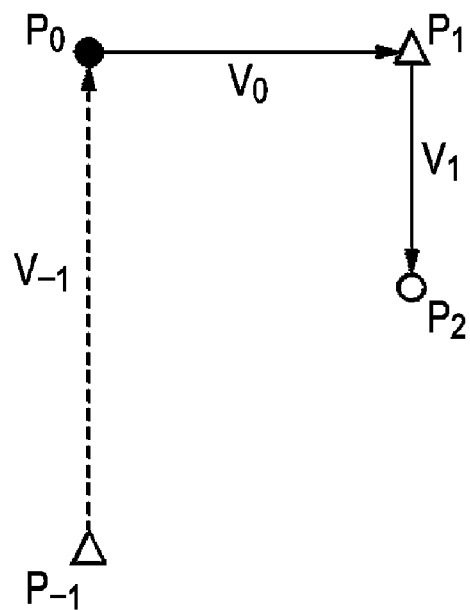
FIGS. 32A and 32B are diagrams illustrating artificial contour points inserted next to the start and end terminal points.

A method for inserting an artificial contour point $P_{-1}$ before a terminal point $P_0$ to be set as the start terminal point will be described below with reference to FIG. 32A. The artificial contour point $P_{-1}$ is set such that an artificial vector $V_{-1}$ starting at the artificial contour point $P_{-1}$ is oriented opposite to the vector $V_{-1}$ starting at the contour point $P_1$ next to the terminal point $P_0$ to be set as the start terminal point. Accordingly, the vector $V_0$ satisfies the above-mentioned condition (1) and is extracted as a tangential segment.

In addition, the length of the artificial vector $V_{-1}$ starting at the artificial contour point $P_{-1}$ is set so as to satisfy the above-mentioned condition (3), so that the artificial vector $V_{-1}$ is also extracted as the tangential segment. Accordingly, the artificial vector $V_{-1}$ and the vector $V_0$ are both extracted as the tangential segments. Therefore, due to the condition "if vectors extracted as tangential segments are adjacent to each other, the point between the vectors is extracted as the anchor point", the terminal point $P_0$ to be set as the start terminal point can be set as the anchor point.

Figure 32B:
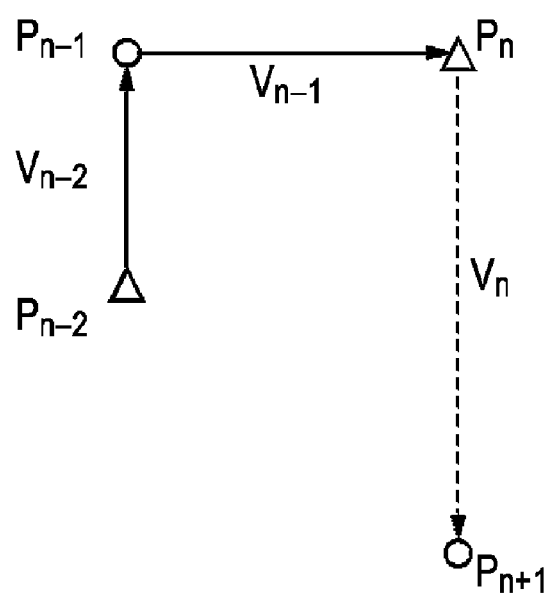

Next, a method for inserting an artificial contour point $P_{n+1}$ after a terminal point $P_n$ to be set as the end terminal point will be described below with reference to FIG. 32B. The artificial contour point $P_{n+1}$ is set such that an artificial vector $V_n$ ending at the artificial contour point $P_{n+1}$ is oriented opposite to the vector $V_{n-2}$ ending at the contour point $P_{n-1}$ previous to the terminal point $P_n$ to be set as the end terminal point. Accordingly, the vector $V_{n-1}$ satisfies the above-mentioned condition (1) and is extracted as a tangential segment. In addition, the length of the artificial vector $V_n$ ending at the artificial contour point $P_{n+1}$ is set so as to satisfy the above-mentioned condition (3), so that the artificial vector $V_n$ is also extracted as the tangential segment.

Accordingly, the artificial vector $V_{n-1}$ and the vector $V_n$ are both extracted as the tangential segments. Therefore, due to the condition "if vectors extracted as tangential segments are adjacent to each other, the point between the vectors is extracted as the anchor point", the terminal point $P_n$ to be set as the end terminal point can be set as the anchor point.

After the points to be inserted before and after the start and end terminal points, respectively, are determined such that the start and end terminal points can be extracted as the anchor points, the inserted points are connected by a series of horizontal and vertical vectors. More specifically, in addition to the original contour-point sequence extending from the start terminal point to the end terminal point, a contour-point sequence extending from the end terminal point to the start terminal point via the inserted points is generated. Then, the start/end terminal-point information including information indicating which of the contour points is the start terminal point and which of the contour points is the end terminal point is generated. In an embodiment, the coordinates of the start and end terminal points are used as the start/end terminal-point information.

Figure 33:
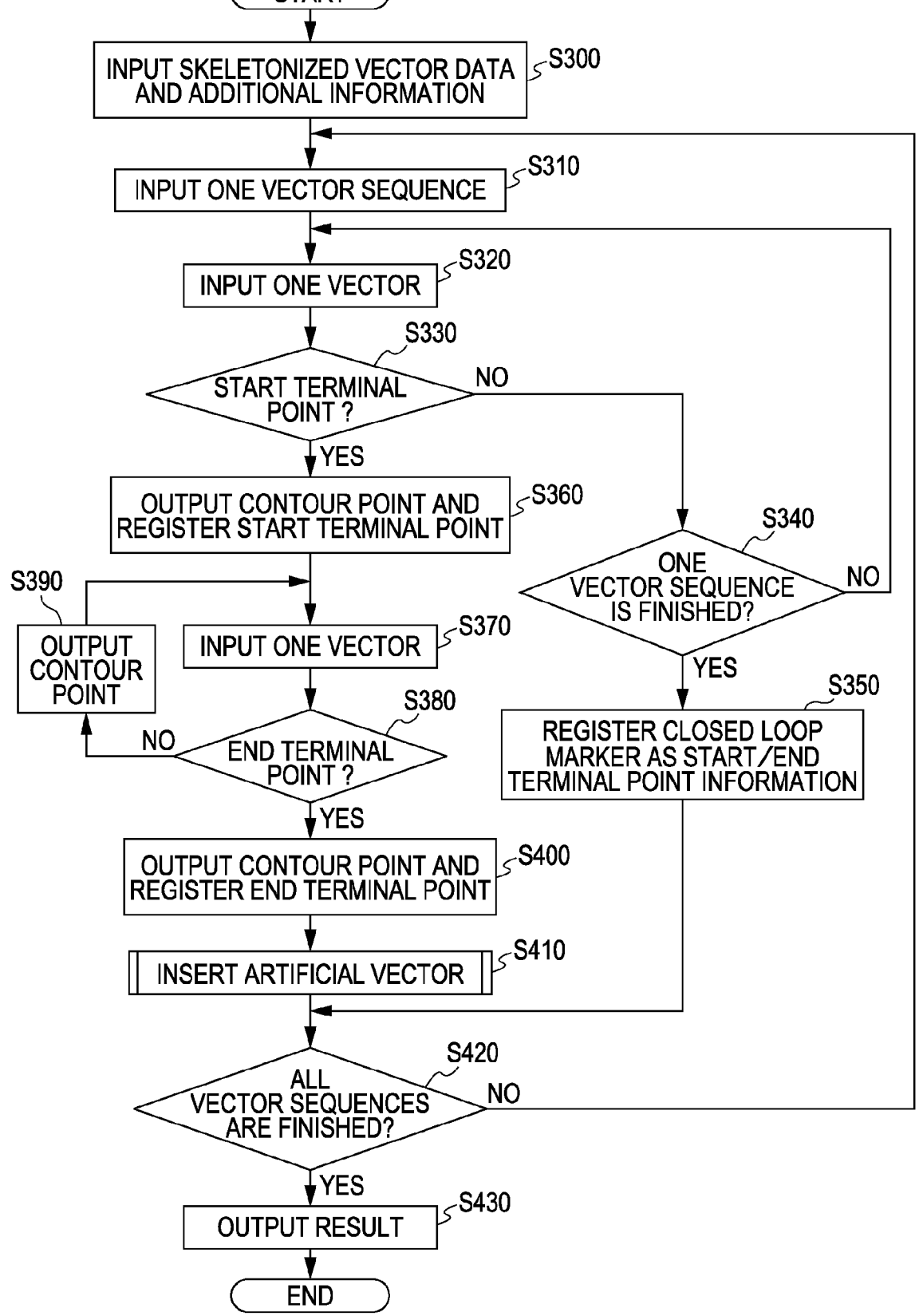
FIG. 33 is a flowchart illustrating a process performed by an artificial-vector-inserted data generator according to an embodiment.

The process performed by the artificial-vector-inserted data generator 320 according to an embodiment will be described below with reference to the flowchart shown in FIG. 33.

In step S300, the skeletonized vector data representing the vector sequences surrounding zero-width line elements is input from the skeletonized-vector-data generator 310.

In step S310, from the vector sequences included in the skeletonized vector data that is input in Step 300 in the format shown in FIG. 29, the $k^{th}$ vector sequence ($k^{th}$ contour line in FIG. 29 ($1 \leq k \leq a$)) is selected as a current process target.

Next, in step S320, from the contour points of the vectors included in the vector sequence selected in step S310 (the total number of contour points is, for example, p), the $q^{th}$ contour point ($1 \leq q \leq p$) is selected as a current process target. Then, in Step 330, it is determined whether or not the current process target is the start terminal point. Until the start terminal point is found in step S330, q is successively incremented from 1 to p each time step S120 is executed.

In step S330, by referring to the contour-point information of the contour point selected in step S320, it is determined whether or not the selected contour point is to be set as the start terminal point. If the selected contour point is to be set as the start terminal point, the process proceeds to step S360. Otherwise, the process proceeds to step S340. The determination of whether or not the selected contour point is to be set as the start terminal point is performed by referring to the contour-point information of the selected contour point and checking whether one of "UP_RIGHT_LT (03H)", "DOWN_ LEFT_RB (0FH)", "LEFT_UP_BL (17H)", and "RIGHT_ DOWN_TR (1BH)" shown in FIG. 9 is set for the selected contour point. Alternatively, the determination can also be made by checking whether bit 1 and bit 0 of the value set in the "value" column in FIG. 9 are both set to "1".

In step S340, it is determined whether or not all of the vectors included in the vector sequence selected from the skeletonized vector data in step S310 are processed. If the result of the determination is "NO", the process returns to step S320 to perform the determination of step S330 for the next vector in the vector sequence.

If there is no contour point that can be set as the start terminal point in the vector sequence selected in step S310, it is determined that the process for the selected vector sequence is finished and the process proceeds to step S350.

In step S350, closed-loop markers which indicate that the corresponding vector sequence is a closed loop that has no terminal point is attached to the vector sequence. In addition, the vectors included in the vector sequence are directly output together with the closed-loop markers.

Figure 37A:
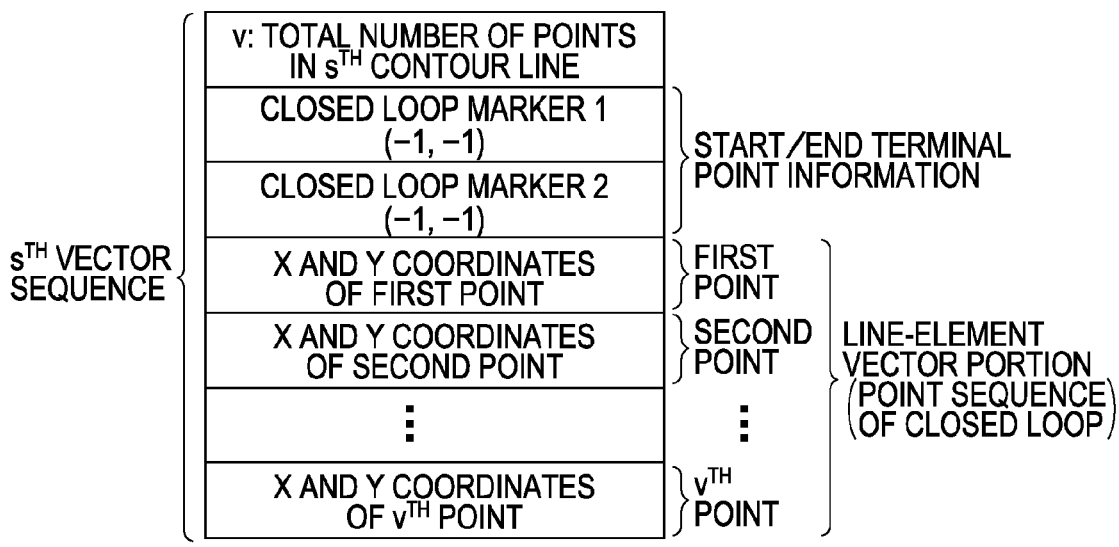
FIGS. 37A and 37B are diagrams illustrating examples of data formats of the artificial-vector-inserted data and the smoothed vector data.

FIG. 37A shows an example of a format of data output in step S350. When, for example, the selected vector sequence corresponds to the $s^{th}$ contour line, v vectors are included in the vector sequence being processed.

As the closed-loop markers, the coordinates (−1, −1) are input for each of the start and end terminal points in the start/end terminal-point information, which is impossible if the start and end terminal points are present.

After step S350 is executed, the process proceeds to step S420.

In step S360, the contour point is registered as the start terminal point and is output together with the remaining contour points. Then, the process proceeds to step S370.

In step S370, from the contour points of the vectors included in the vector sequence selected in step S310 (the total number of contour points is, for example, p), the $q^{th}$ contour point ($1 \leq q \leq p$) is selected as a current process target. First, the contour point next to the contour point registered as the start terminal point is selected. Then, until the end terminal point is found in step S380, q is successively incremented from the number corresponding to the contour point selected first to p.

In step S380, by referring to the contour-point information of the contour point selected in step S370, it is determined whether or not the selected contour point is to be set as the end terminal point. If the selected contour point is to be set as the end terminal point, the process proceeds to step S400. Otherwise, the process proceeds to step S390.

The determination of whether or not the selected contour point is to be set as the end terminal point is performed by referring to the contour-point information of the selected contour point and checking whether one of "UP_RIGHT_TL (01H)", "DOWN_LEFT_BR (0DH)", "LEFT_UP_LB (15H)", and "RIGHT_DOWN_RT (19H)" shown in FIG. 9 is set for the selected contour point. Alternatively, the determination can also be made by checking whether bit 1 and bit 0 of the value set in the "value" column in FIG. 9 are set to "0" and "1", respectively.

In step S390, the contour point being processed is output as one of the contour points placed between the start terminal point and the end terminal point. Then, the process proceeds to step S370.

In step S400, the contour point being processed is registered as the end terminal point, and the contour points output in step S390 are output as contour points placed between the start terminal point and the end terminal point. Then, the process proceeds to step S410.

By the time step S410 is executed, both the start terminal point and the end terminal point of the vector sequence are determined and the vectors arranged in series from the start terminal point to the end terminal point are also determined. Accordingly, in step S410, the artificial vectors to be inserted in series from the end terminal point to the start terminal point are determined. The process performed in step S410 will be described in detail below with reference to the flowchart shown in FIG. 34 and diagrams shown in FIGS. 35 and 36. After the execution of step S410, the process proceeds to step S420.

In step S420, it is determined whether or not all of the vector sequences included in the skeletonized vector data input in step S300 are processed. If the result of the determination is "YES", the process proceeds to step S430. If the result of the determination is "NO", the process returns to step S310 to repeat the operations of steps S310 to S410 for the next vector sequence.

In step S430, the process result for the skeletonized vector data input in step S300 is output.

Figure 37B:
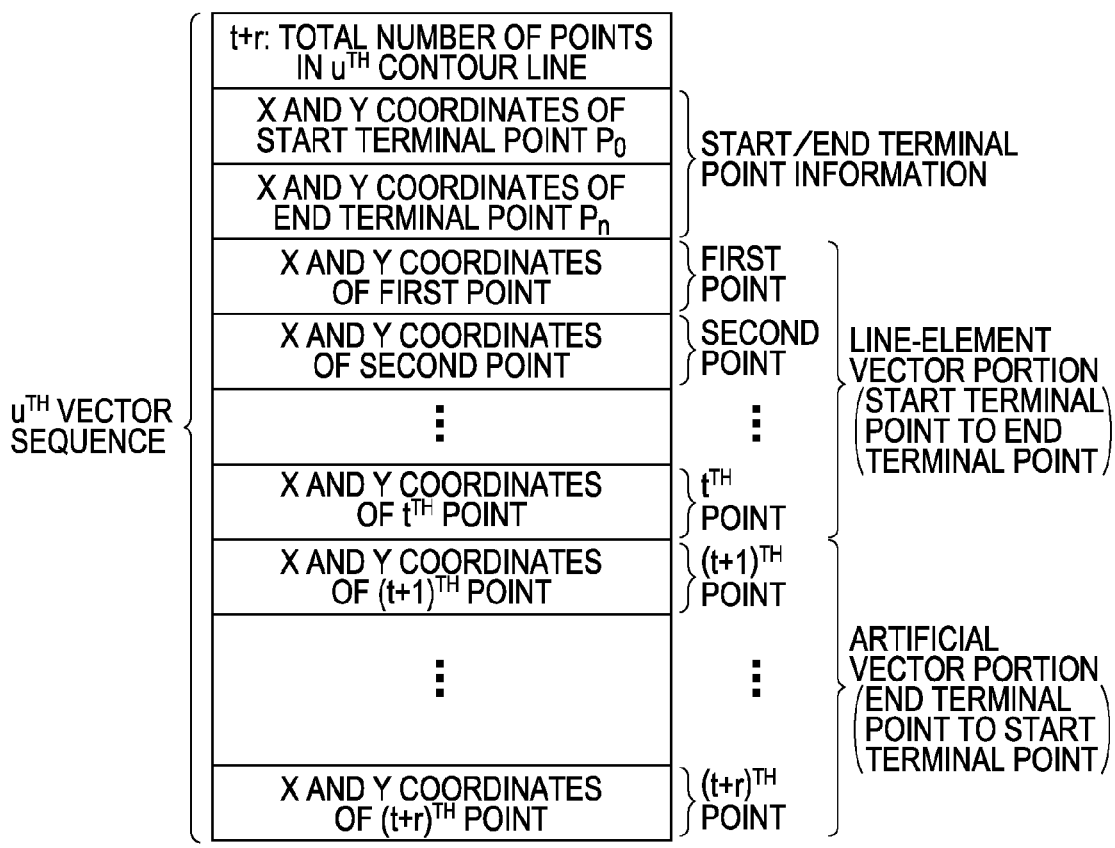

FIG. 37B shows an example of the process result output for a vector sequence. This example corresponds to the case in which the start and end terminal points, vectors arranged in series from the start terminal point to the end terminal point, and artificial vectors inserted in series from the end terminal point to the start terminal point are determined for the vector sequence. In FIG. 37B, the $u^{th}$ vector sequence is selected as the process target, and t vectors are arranged in series from the start terminal point to the end terminal point. In addition, r artificial vectors are inserted in series from the end terminal point to the start terminal point. In this example, the first point is the start terminal point and the $t^{th}$ point is the end terminal point.

Figure 34:
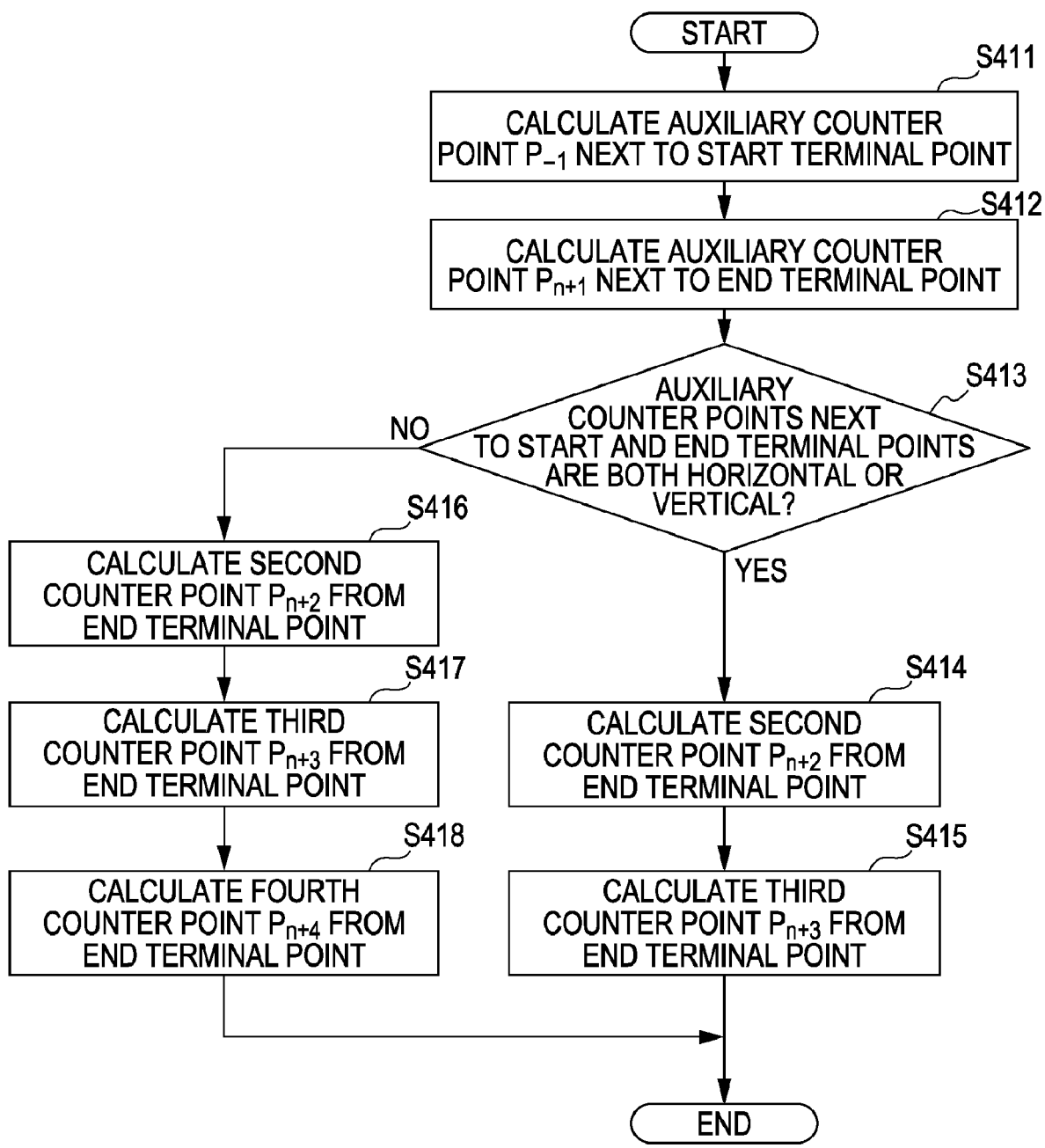
FIG. 34 is a flowchart illustrating a process of generating artificial vectors to be inserted in series from the end terminal point to the start terminal point according to an embodiment.

The process preformed in step S410 in the flowchart shown in FIG. 33 will be described below with reference to the flowchart shown in FIG. 34. Before this process is started, both the start terminal point and the end terminal point of the vector sequence are determined, and the vectors arranged in series from the start terminal point to the end terminal point are also determined. In the process of the flowchart shown in FIG. 34, artificial vectors to be inserted in series from the end terminal point to the start terminal point are determined. Similar to the process shown in FIG. 33, the process shown in FIG. 34 is performed by the artificial-vector-inserted data generator 320.

In step S411, the coordinates of the artificial contour point $P_{-1}$ to be inserted before the terminal point $P_0$ serving as the start terminal point are determined as described above with reference to FIG. 32A. More specifically, the artificial contour point $P_{-1}$ is determined such that the artificial vector $V_{-1}$ starting at the artificial contour point $P_{-1}$ is oriented opposite to the vector $V_1$ starting at the contour point $P_1$ next to the terminal point $P_0$ serving as the start terminal point, and such that the artificial vector $V_{-1}$ starting at the artificial contour point $P_{-1}$ is long enough to satisfy the above-mentioned condition (3) (for example, ten pixels or more).

Next, in step S412, the coordinates of the artificial contour point $P_{n+1}$ to be inserted after the terminal point $P_n$ serving as the end terminal point are determined as described above with reference to FIG. 32B. More specifically, the artificial contour point $P_{n+1}$ is determined such that the artificial vector $V_n$ ending at the artificial contour point $P_{n+1}$ is oriented opposite to the vector $V_{n-2}$ ending at the contour point $P_{n-1}$ previous to the terminal point $P_n$ serving as the end terminal point, and such that the artificial vector $V_n$ ending at the artificial contour point $P_{n+1}$ is long enough to satisfy the above-mentioned condition (3) (for example, ten pixels or more).

In step S413, it is determined whether or not the artificial vector $V_{-1}$ starting at the artificial contour point $P_{-1}$, which is determined in step S411 to be inserted before the terminal point $P_0$ serving as start terminal point, and the artificial vector $V_n$ ending at the artificial contour point $P_{n+1}$, which is determined in step S412 to be inserted after the terminal point $P_n$ serving as the end terminal point, are both horizontal or vertical.

If the result of the determination is "YES" in step S413, the process proceeds to step S414. If the result of the determination is "NO" in step S413, the process proceeds to step S416.

Figure 35:
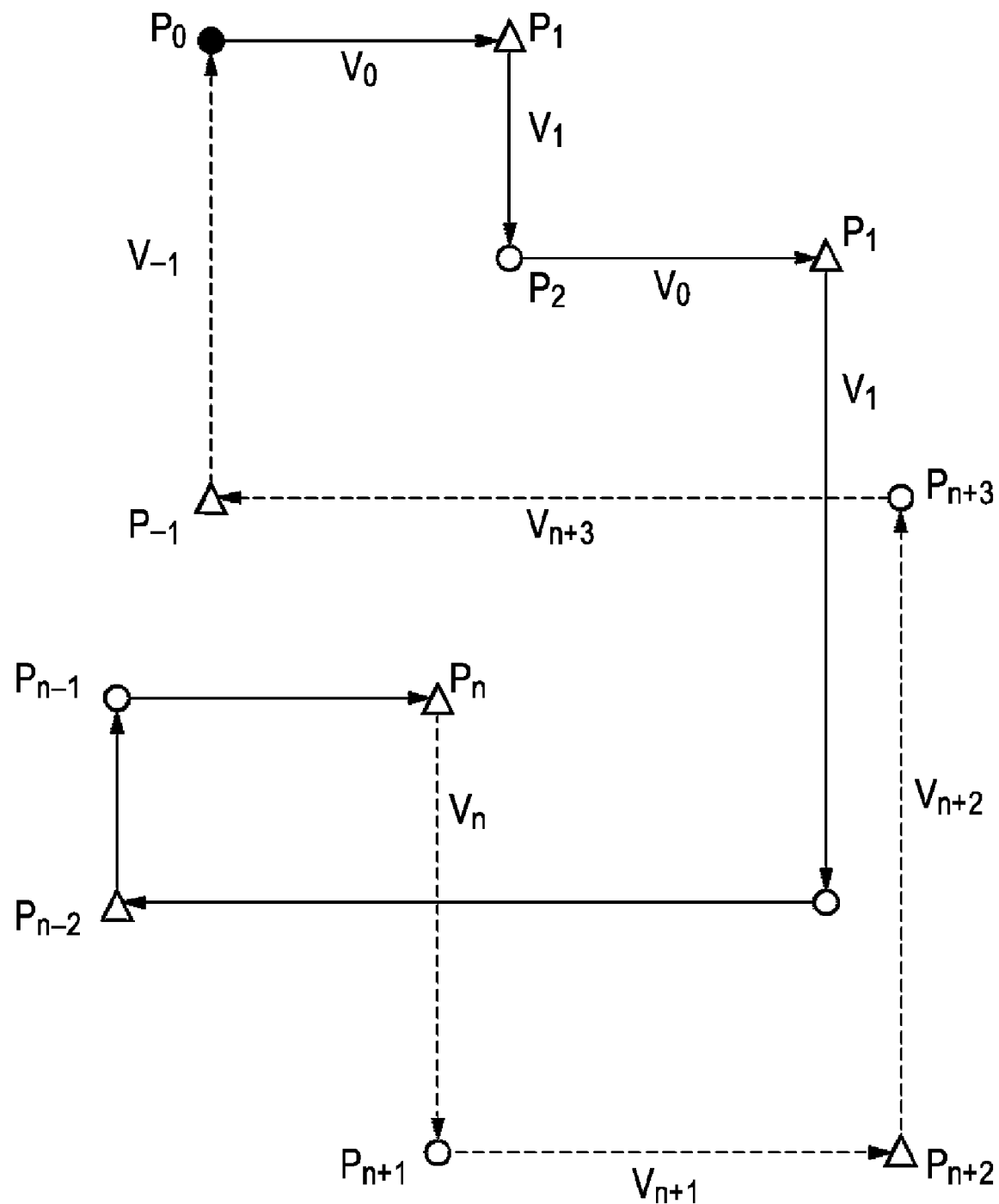
FIG. 35 is a diagram illustrating the artificial vectors inserted in series from the end terminal point to the start terminal point.

An example of the case in which both of the artificial vectors $V_{-1}$ and $V_n$ are horizontal or vertical is shown in FIG. 35.

In step S414, a second artificial contour point $P_{n+2}$ counted from the terminal point $P_n$ serving as the end terminal point is set at a position farther away from the point $P_{-1}$ than the point $P_{n+1}$. Here, the artificial contour point $P_{n+2}$ is set such that the artificial vector $V_{n+1}$ ending at the artificial contour point $P_{n+2}$ is long enough to satisfy the above-mentioned condition (3) (for example, ten pixels or more).

Then, in step 415, a third artificial contour point $P_{n+3}$ counted from the terminal point $P_n$ serving as the end terminal point (which coincides with the second artificial contour point counted from the terminal point $P_0$ serving as the start terminal point) is set between the artificial points $P_{n+2}$ and $P_{-1}$ such that horizontal and vertical vectors are alternately connected. Thus, the artificial contour points $P_{n+1}$, $P_{n+2}$, $P_{n+3}$, and $P_{-1}$ are determined. Accordingly, the process of inserting the series of artificial contour points is finished and the process returns to step S420 in the flowchart shown in FIG. 33.

Figure 36:
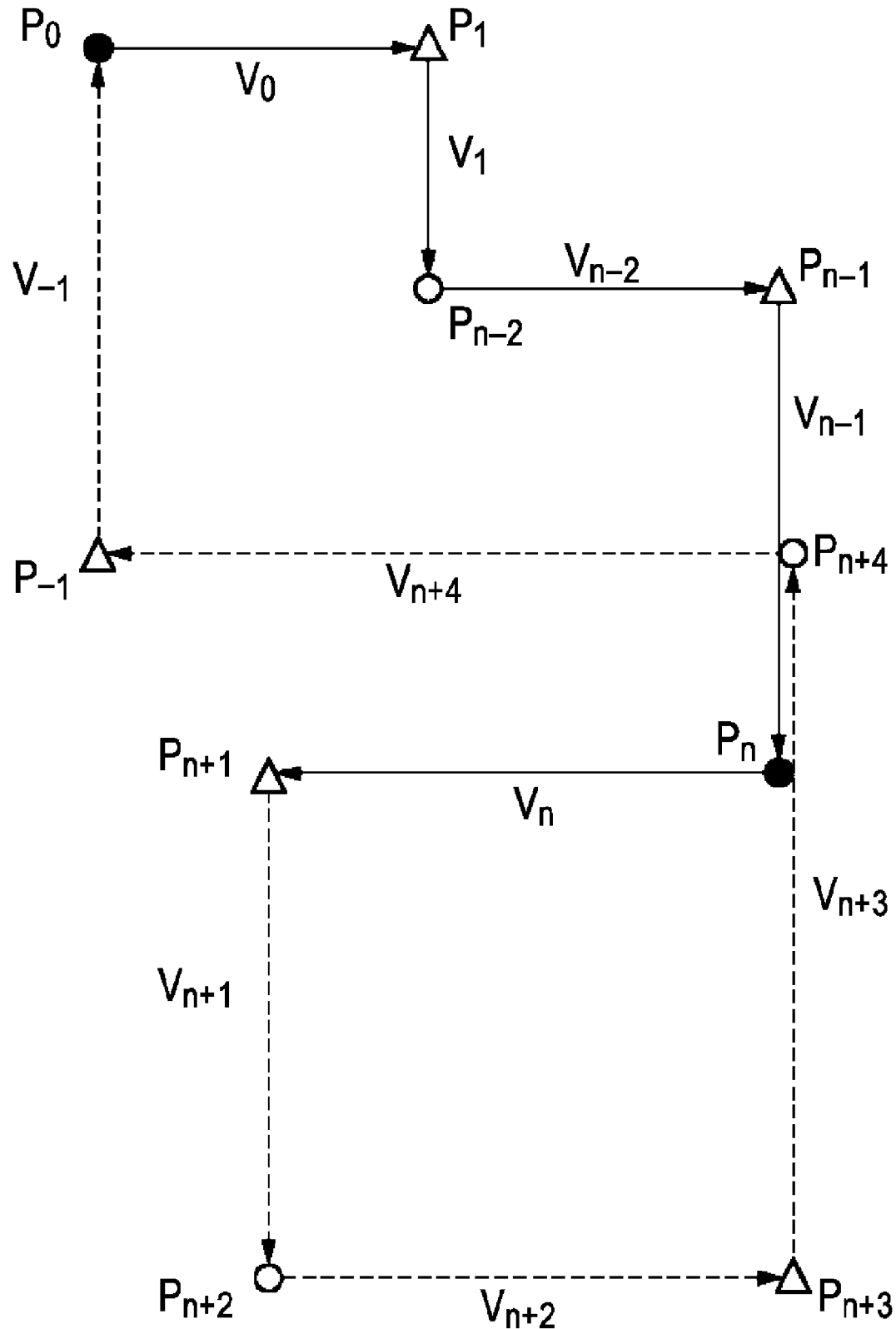
FIG. 36 is a diagram illustrating the artificial vectors inserted in series from the end terminal point to the start terminal point.

In step S416, one the vectors $V_{-1}$ and $V_n$ is horizontal and the other one is vertical. An example of this case is shown in FIG. 36.

In step S416, a second artificial contour point $P_{n+2}$ counted from the terminal point $P_n$ serving as the end terminal point is set at a position farther away from the point $P_{-1}$ than the point $P_{n+1}$. Here, the artificial contour point $P_{n+2}$ is set such that the artificial vector $V_{n+1}$ ending at the artificial contour point $P_{n+2}$ is long enough to satisfy the above-mentioned condition (3) (for example, ten pixels or more).

In step S417, a third artificial contour point $P_{n+3}$ is set at a position farther away from the point $P_{-1}$ than the point $P_{n+2}$, Here, the artificial contour point $P_{n+3}$ is set such that the artificial vector $V_{n+2}$ ending at the artificial contour point $P_{n+3}$ is long enough to satisfy the above-mentioned condition (3) (for example, ten pixels or more).

Then, in step 418, a fourth artificial contour point $P_{n+4}$ counted from the terminal point $P_n$ serving as the end terminal point (which coincides with the second artificial contour point counted from the terminal point $P_0$ serving as the start terminal point) is set between the points $P_{n+3}$ and $P_{-1}$ such that horizontal and vertical vectors are alternately connected. Thus, the artificial contour points $P_{n+1}$, $P_{n+2}$, $P_{n+3}$, $P_{n+4}$, and $P_{-1}$ are determined. Accordingly, the process of inserting the artificial contour points is finished and the process returns to step S420 in the flowchart shown in FIG. 33.

As described above, the artificial-vector-inserted data generator 320 receives the skeletonized vector data from the skeletonized-vector-data generator 310. Then, the artificial-vector-inserted data generator 320 generates the artificial-vector-inserted data by inserting the artificial vectors so that portions corresponding to the terminal points can be maintained as the terminal points (be used as anchor points of Bezier curves). Accordingly, when the vector-data smoothing unit 330 performs a smoothing (function approximation) process, the positions of the terminal points can be prevented from becoming unclear due to integration of vectors corresponding to the terminal points with other vectors.

In addition, the artificial-vector-inserted data generator 320 also generates the start/end terminal-point information for each of the vector sequences included in the artificial-vector-inserted data. The start/end terminal-point information represents which of the vectors correspond to the terminal points. The generated process result is expressed, for example, in the form obtained by replacing the data of each contour line shown in FIG. 29 with the data of vector sequence shown in FIG. 37A or 37B. In an embodiment, the process result is output in this form.

The vector-data smoothing unit 330 performs the smoothing (function approximation) process for each of the vector sequences included in the artificial-vector-inserted data and thereby generates the smoothed vector data. The result of this process is output to the smoothed-vector-data identifying unit 340. At this time, the start/end terminal-point information generated by the artificial-vector-inserted data generator 320 is also output to the smoothed-vector-data identifying unit 340.

The smoothed-vector-data identifying unit 340 receives the smoothed vector data obtained by the vector-data smoothing unit 330 and the start/end terminal-point information obtained by the artificial-vector-inserted data generator 320. Then, for each vector sequence in the smoothed vector data, the start and end terminal points are identified by comparing the coordinates of each contour point included in the vector sequence with the coordinates of the start and end terminal points. Then, smoothed, non-circumference vector data including only the vector sequences starting from the start terminal points and ending at the end terminal points is generated.

Then, the process result is output by the smoothed-vector-data output unit 350 to an external device as a file or via communication I/F.

The thus-generated process result can be expressed in the form similar to that shown in FIG. 29. In this result, in place of the above-described contour-point information, each contour point can have attribute information indicating whether or not the contour point is an anchor point as the additional information.

Modification of First Embodiment

FIGS. 29, 37A, and 37B simply show examples of data formats, and the present invention is not limited to them. For example, the smoothed vector data can also be output in the SVG format. In addition, a table including only the total numbers of contour points in the respective vector sequences can be written in a data area separated from the data regarding vectors in the vector sequences. For example, in FIG. 29, the segments indicating the total numbers of points in the first to $a^{th}$ contour lines can be collected next to each other in a certain data area, and then the segments indicating the data regarding the first to $a^{th}$ contour lines can be placed in the next data area. In addition, the start/end terminal-point information is not limited to the closed-loop markers shown in FIG. 37A as long as the vector sequences with and without the start/end terminal points can be distinguished from each other.

Other Embodiments

According to an embodiment of the present invention, a storage medium storing a software program code for carrying out the functions of the above-described embodiment can be supplied to a system or an apparatus. In addition, a case in which a program code stored in the memory medium is read out and executed by a computer included in the system or the apparatus is also included within the scope of the present invention.

Thus, the function of above-described embodiments can be achieved by the program code itself that is read out by the computer from the storage medium. In other words, the present invention covers the storage medium in which the program code is stored.

The storage medium for supplying the program code may be, for example, a flexible disk, a hard disk, an optical disc, a magneto-optical disk, a CD-ROM, a CD-R, a nonvolatile memory card, a ROM, etc.

The computer can carry out the functions of the above-described embodiment by reading out and executing the program. In addition, the functions of the above-described embodiment can also be carried out by causing an operating system (OS) or the like running on the computer to perform all or part of the actual processes on the basis of the instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-100377 filed Mar. 31, 2006, No. 2006-100380 filed Mar. 31, 2006, and No. 2006-100381, filed Mar. 31, 2006, which are hereby incorporated by reference herein in their entirety.

What is claimed is:

1. A method comprising:
performing a thinning process of an image to output a thinned one-pixel-width line drawing using a processor;
extracting contour vector sequences that surround each of line elements of the thinned one-pixel-width line drawing, using the processor, wherein the line elements correspond to one-pixel-width lines connecting terminal points and intersections of the thinned one-pixel-width line drawing; and
generating skeletonized vector data that surround each of zero-width line elements by shifting positions of the extracted contour vector sequences that surround each of the line elements of the thinned one-pixel-width line drawing, using the processor.

2. The method according to claim 1, wherein the extracted contour vector sequences include vectors surrounding each of the line elements of the thinned one-pixel-width line drawing and contour-point information indicating portions that correspond to the terminal points and the intersections in the thinned one-pixel-width line drawing.

3. The method according to claim 2, wherein the contour-point information includes orientations of vectors ending at contour points included in the contour vector sequences and orientations of vectors starting at the contour points included in the contour vector sequences.

4. The method according to claim 1, wherein the skeletonized vector data is generated in the generating step by shifting the positions of the extracted contour vector sequences in units of a half pixel.

5. The method according to claim 1, wherein the contour vector sequences are extracted in the extracting step by raster-scanning the thinned one-pixel-width line drawing in units of a pixel matrix including a target pixel and pixels surrounding the target pixel.

6. The method according to claim 5, wherein the pixel matrix is a 3-pixel-by-3-pixel matrix.

7. The method according to claim 5, wherein a pattern that matches the pixel values of the target pixel and the pixels surrounding the target pixel is selected from predetermined patterns in the extracting step, and the contour vector sequences are extracted in the extracting step based on a vector sequence set for the selected pattern.

8. The method according to claim 1, further comprising a step of:
   determining a start terminal point and an end terminal point in the skeletonized vector data based on the terminal points and the intersections in the thinned one-pixel-width line drawing, generating artificial vectors to be inserted between the determined start and end terminal points, and generating artificial-vector-inserted vector data based on the skeletonized vector data and the generated artificial vectors.

9. The method according to claim 8, wherein, if it is determined that there is no start terminal point or end terminal point in the skeletonized vector data based on of the information regarding the terminal points and the intersections in the thinned one-pixel-width line drawing, information representing a closed loop is attached to the vector data.

10. The method according to claim 8, further comprising steps of:
    performing a smoothing process for the artificial-vector-inserted vector data to obtain smoothed vector data; and
    generating smoothed, non-circumference vector data based on the obtained smoothed vector data and the start and end terminal points.

11. An apparatus comprising:
    a thinning unit configured to perform a thinning process of an image to output a thinned image including a thinned one-pixel-width line drawing;
    an extracting unit configured to extract contour vector sequences that surround each of line elements of the thinned one-pixel-width line drawing, wherein the line elements correspond to one-pixel-width lines connecting terminal points and intersections of the thinned one-pixel-width line drawing; and
    a skeletonizing unit configured to generate skeletonized vector data that surround each of zero-width line elements by shifting positions of the extracted contour vector sequences that surround each of the line elements of the thinned one-pixel-width line drawing.

12. The apparatus according to claim 11, wherein the contour vector sequences extracted by the extracting unit include vectors surrounding each of the line elements of the thinned one-pixel-width line drawing and contour-point information indicating portions that correspond to the terminal points and the intersections in the thinned one-pixel-width line drawing.

13. The apparatus according to claim 12, wherein the contour-point information includes orientations of vectors ending at contour points included in the contour vector sequences and orientations of vectors starting at the contour points included in the contour vector sequences.

14. The apparatus according to claim 11, wherein the skeletonizing unit generates the skeletonized vector data by shifting the positions of the extracted contour vector sequences in units of a half pixel.

15. The apparatus according to claim 11, wherein the contour vector sequences are extracted in the extracting unit by raster-scanning the thinned one-pixel-width line drawing in units of a pixel matrix including a target pixel and pixels surrounding the target pixel.

16. The apparatus according to claim 15, wherein the pixel matrix is a 3-pixel-by-3-pixel matrix.

17. The apparatus according to claim 15, wherein the extracting unit selects a pattern that matches the pixel values of the target pixel and the pixels surrounding the target pixel from predetermined patterns, and extracts the contour vector sequences based on a vector sequence set for the selected pattern.

18. The apparatus according to claim 11, further comprising:
    an artificial-vector-inserted data generator configured to determine a start terminal point and an end terminal point in the skeletonized vector data based on the information regarding the terminal points and the intersections in the thinned one-pixel-width line drawing, generate artificial vectors to be inserted between the determined start and end terminal points, and generate artificial-vector-inserted vector data based on the skeletonized vector data and the generated artificial vectors.

19. The apparatus according to claim 18, wherein if it is determined that there is no start terminal point or end terminal point in the skeletonized vector data based on the information regarding the terminal points and the intersections in the thinned one-pixel-width line drawing, the artificial-vector-inserted data generator attaches information representing a closed loop to the vector data.

20. The apparatus according to claim 18, further comprising:
    a smoothing unit of performing a smoothing process for the artificial-vector-inserted vector data to obtain smoothed vector data; and
    a non-circumference vector data generator configured to generate smoothed non-circumference vector data based on the smoothed vector data obtained by the smoothing unit and the start and end terminal points.

21. A non-transitory computer-readable storage medium storing instructions which, when executed by an apparatus, causes the apparatus to perform operations comprising:
    performing a thinning process of an image to output a thinned one-pixel-width line drawing using a processor;
    extracting contour vector sequences that surround each of line elements of the thinned one-pixel-width line drawing, using the processor, wherein the line elements correspond to one-pixel-width lines connecting terminal points and intersections of the thinned one-pixel-line-width line drawing; and
    generating skeletonized vector data that surround each of the zero-width line elements by shifting positions of the extracted contour vector sequences that surround each of the line elements of the thinned one-pixel-width line drawing, using the processor.

* * * * *